(12) United States Patent
Ida et al.

(10) Patent No.: US 10,802,663 B2
(45) Date of Patent: Oct. 13, 2020

(54) INFORMATION PROCESSING APPARATUS, INFORMATION PROCESSING METHOD, AND INFORMATION PROCESSING SYSTEM

(71) Applicant: SONY CORPORATION, Tokyo (JP)

(72) Inventors: Kentaro Ida, Tokyo (JP); Tomoya Narita, Kanagawa (JP); Ikuo Yamano, Tokyo (JP)

(73) Assignee: SONY CORPORATION, Tokyo (JP)

( * ) Notice: Subject to any disclaimer, the term of this patent is extended or adjusted under 35 U.S.C. 154(b) by 224 days.

(21) Appl. No.: 15/266,184

(22) Filed: Sep. 15, 2016

(65) Prior Publication Data

US 2017/0068417 A1 Mar. 9, 2017

Related U.S. Application Data

(63) Continuation of application No. 14/563,681, filed on Dec. 8, 2014, now Pat. No. 9,473,808.

(30) Foreign Application Priority Data

Dec. 16, 2013 (JP) .................. 2013-259106

(51) Int. Cl.
| | | |
|---|---|---|
| G06F 3/03 | (2006.01) | |
| G06F 3/0481 | (2013.01) | |
| G06F 3/00 | (2006.01) | |
| G06F 3/14 | (2006.01) | |
| H04N 21/41 | (2011.01) | |
| H04N 21/4223 | (2011.01) | |
| H04N 21/422 | (2011.01) | |
| G06F 3/0484 | (2013.01) | |

(Continued)

(52) U.S. Cl.
CPC .......... *G06F 3/04812* (2013.01); *G06F 3/005* (2013.01); *G06F 3/0321* (2013.01); *G06F 3/0485* (2013.01); *G06F 3/04842* (2013.01); *G06F 3/1454* (2013.01); *H04N 7/188* (2013.01); *H04N 21/4126* (2013.01); *H04N 21/4223* (2013.01); *H04N 21/42207* (2013.01); *G06F 3/0488* (2013.01); *G09G 2354/00* (2013.01); *G09G 2356/00* (2013.01); *G09G 2370/16* (2013.01)

(58) Field of Classification Search
CPC ...................................................... G06F 3/033
See application file for complete search history.

(56) References Cited

U.S. PATENT DOCUMENTS

| | | | | |
|---|---|---|---|---|
| 7,061,525 B1 * | 6/2006 | Tanaka | ............... | H04N 5/23203 348/211.13 |
| 7,312,766 B1 * | 12/2007 | Edwards | .............. | G02B 27/017 248/115 |

(Continued)

FOREIGN PATENT DOCUMENTS

| | | | | |
|---|---|---|---|---|
| JP | 2003051981 | * | 8/2001 | ............. H04N 5/232 |
| JP | 2011-164666 A | | 8/2011 | |

*Primary Examiner* — Olga V Merkoulova
(74) *Attorney, Agent, or Firm* — Chip Law Group

(57) ABSTRACT

There is provided an information processing apparatus, including a display control section which causes a prescribed pattern to be displayed on a screen in a state where a device having a camera is arranged so that the camera faces the screen, and a position acquisition section which acquires a relative position of the camera with respect to the screen determined based on an image of the pattern captured by the camera.

21 Claims, 33 Drawing Sheets

(51) Int. Cl.
  *G06F 3/0485* (2013.01)
  *H04N 7/18* (2006.01)
  *G06F 3/0488* (2013.01)

(56) References Cited

U.S. PATENT DOCUMENTS

| | | | |
|---|---|---|---|
| 2002/0047910 A1* | 4/2002 | Tariki | H04N 7/181 |
| | | | 348/239 |
| 2002/0126208 A1* | 9/2002 | Misue | H04N 5/232 |
| | | | 348/578 |
| 2004/0218099 A1* | 11/2004 | Washington | H04N 21/4382 |
| | | | 348/571 |
| 2005/0168399 A1* | 8/2005 | Palmquist | G06F 1/1601 |
| | | | 345/1.1 |
| 2005/0223333 A1* | 10/2005 | Yamamoto | G06F 3/04845 |
| | | | 715/765 |
| 2009/0244015 A1* | 10/2009 | Sengupta | H04W 4/21 |
| | | | 345/173 |
| 2010/0053164 A1* | 3/2010 | Imai | G06F 3/011 |
| | | | 345/427 |
| 2011/0083111 A1* | 4/2011 | Forutanpour | H04W 4/21 |
| | | | 715/863 |
| 2011/0187725 A1* | 8/2011 | Matsuda | G06F 3/017 |
| | | | 345/473 |
| 2013/0218765 A1 | 8/2013 | Hammad et al. | |
| 2014/0019352 A1 | 1/2014 | Shrivastava | |
| 2014/0067677 A1 | 3/2014 | Ali et al. | |
| 2014/0293017 A1* | 10/2014 | Fei | G09F 9/3026 |
| | | | 348/51 |

\* cited by examiner

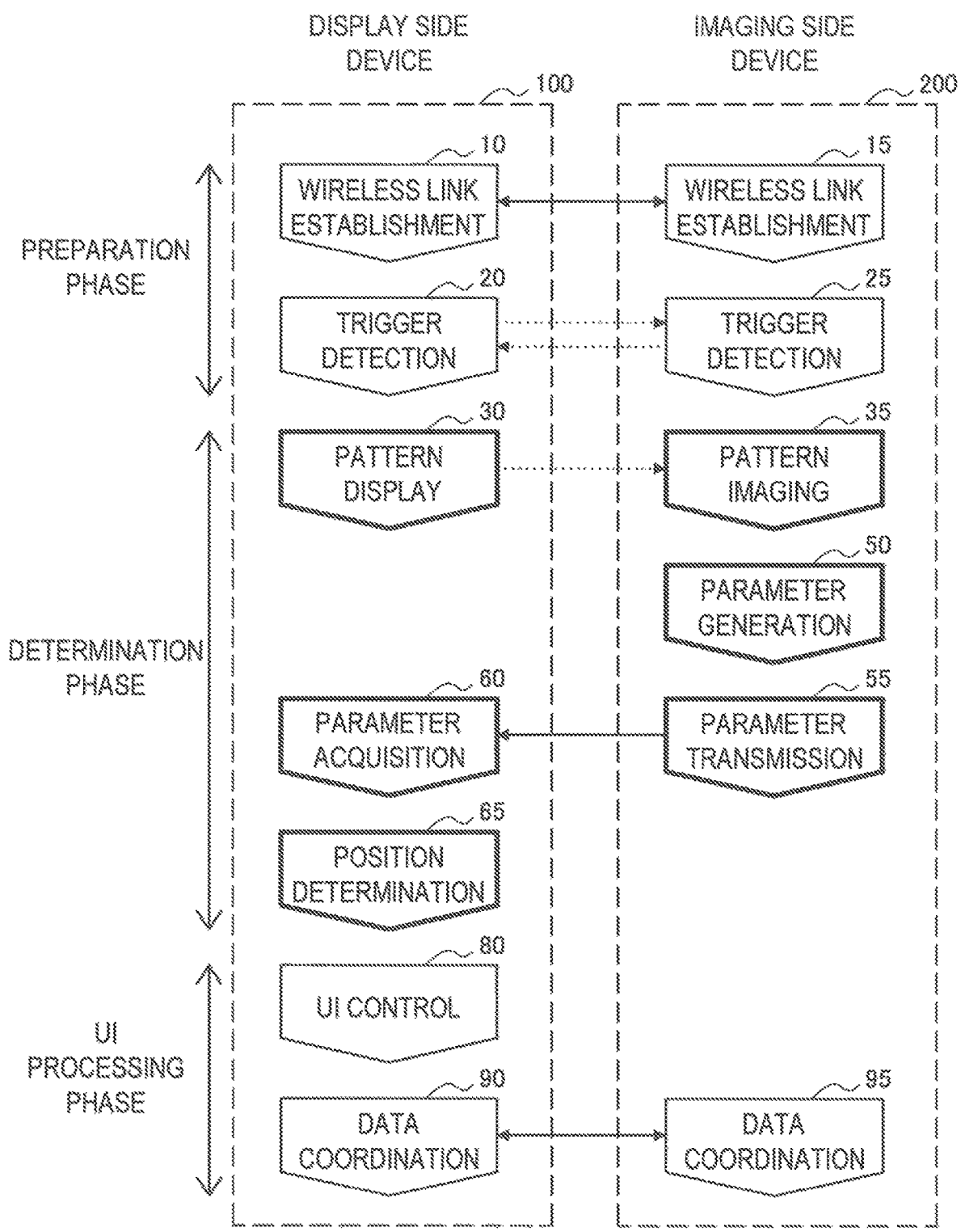

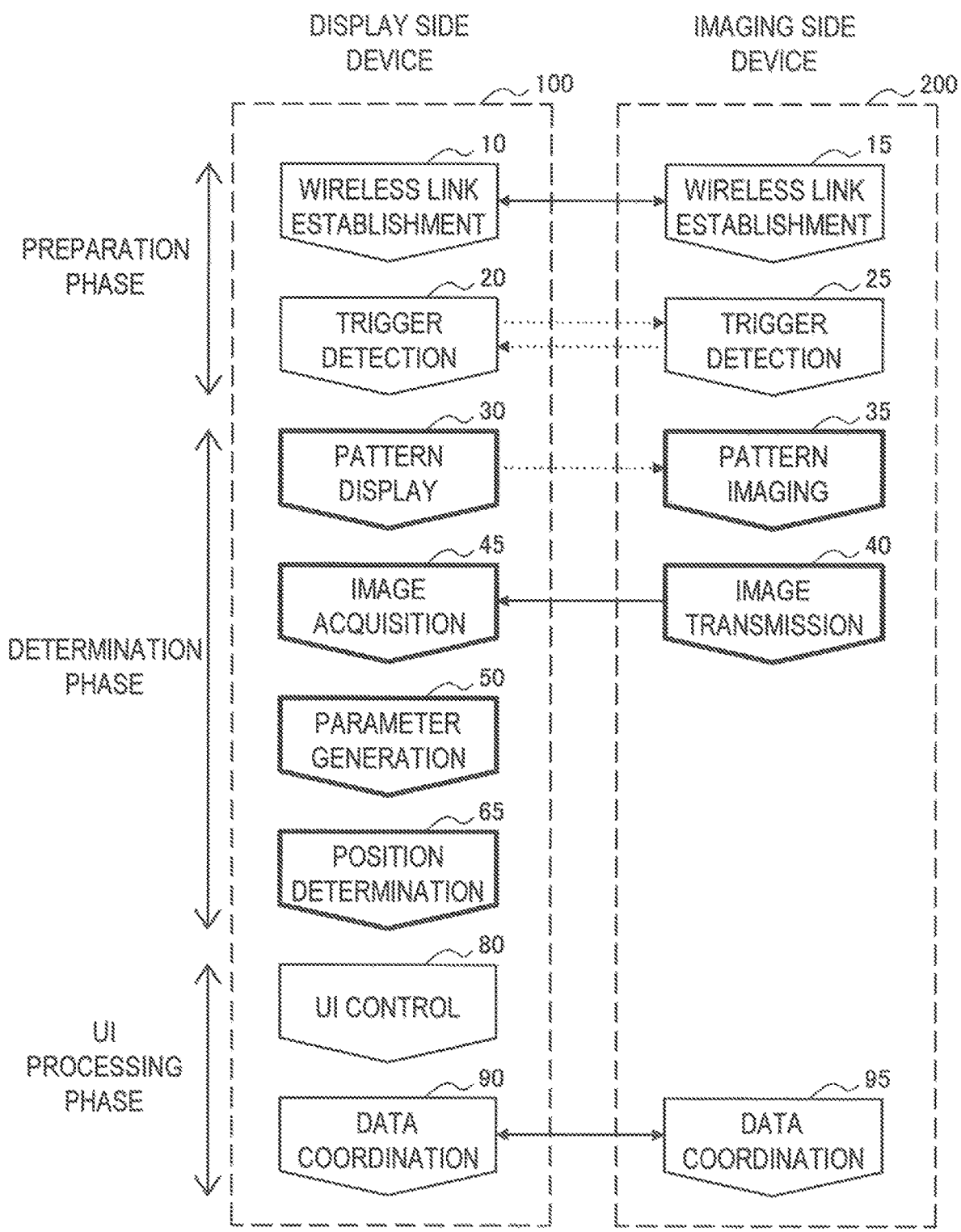

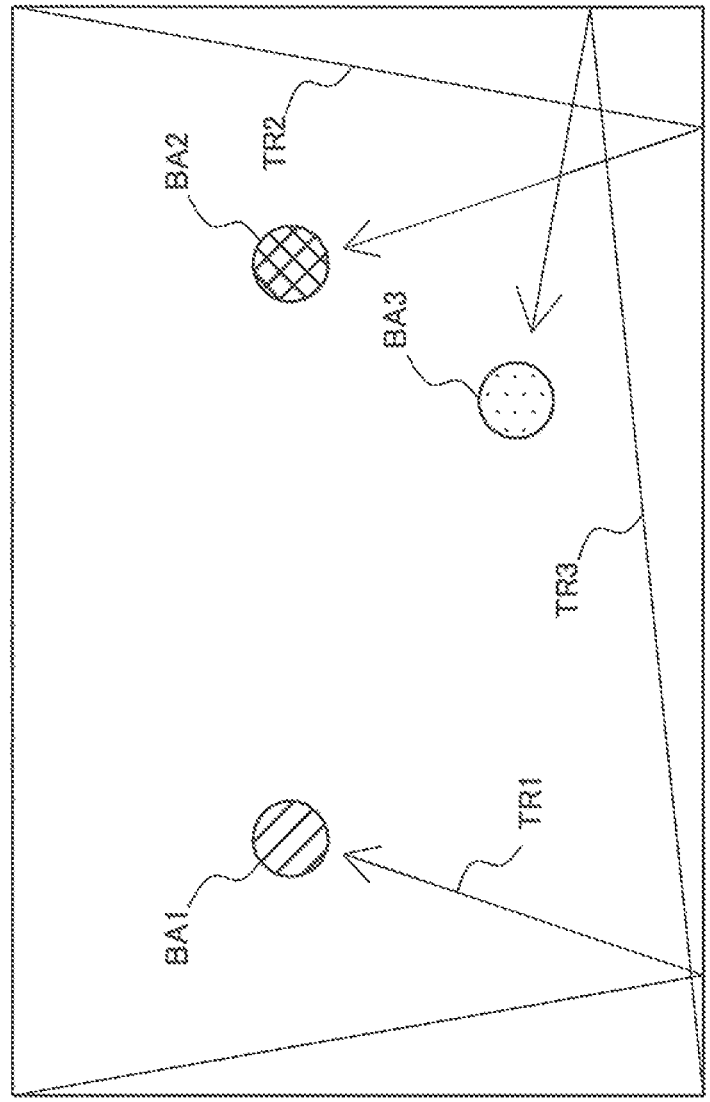

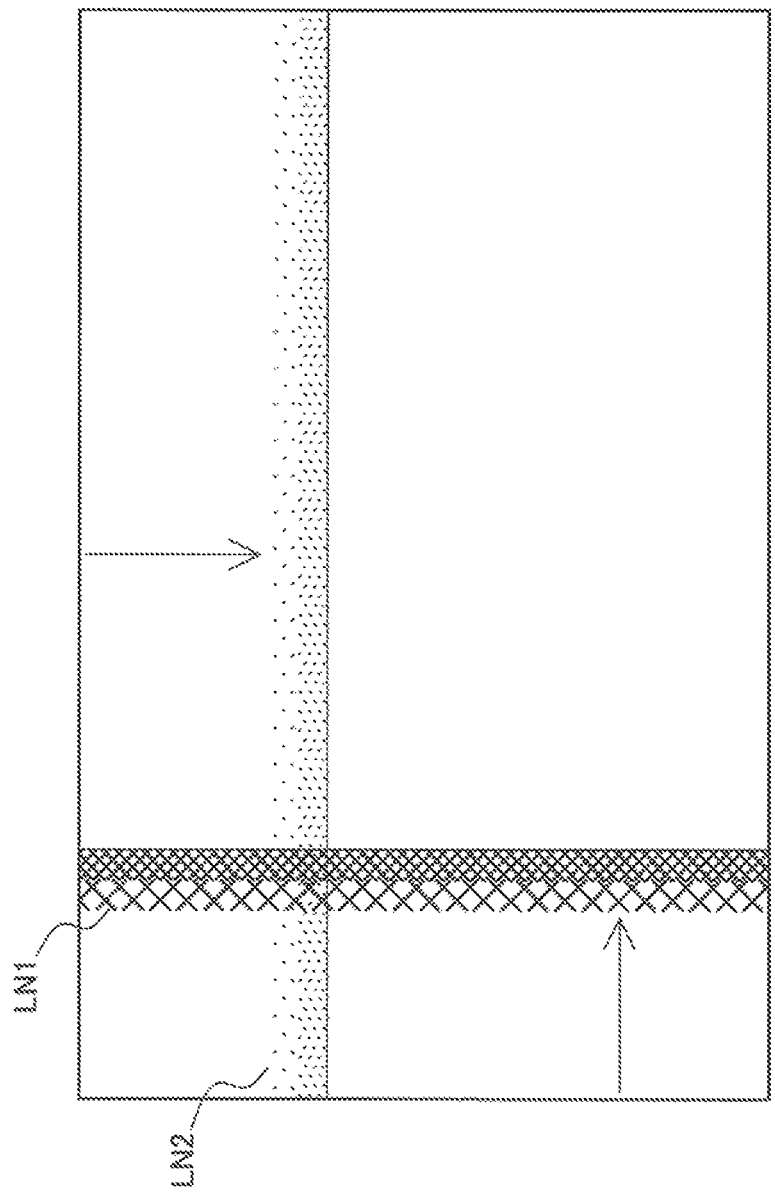

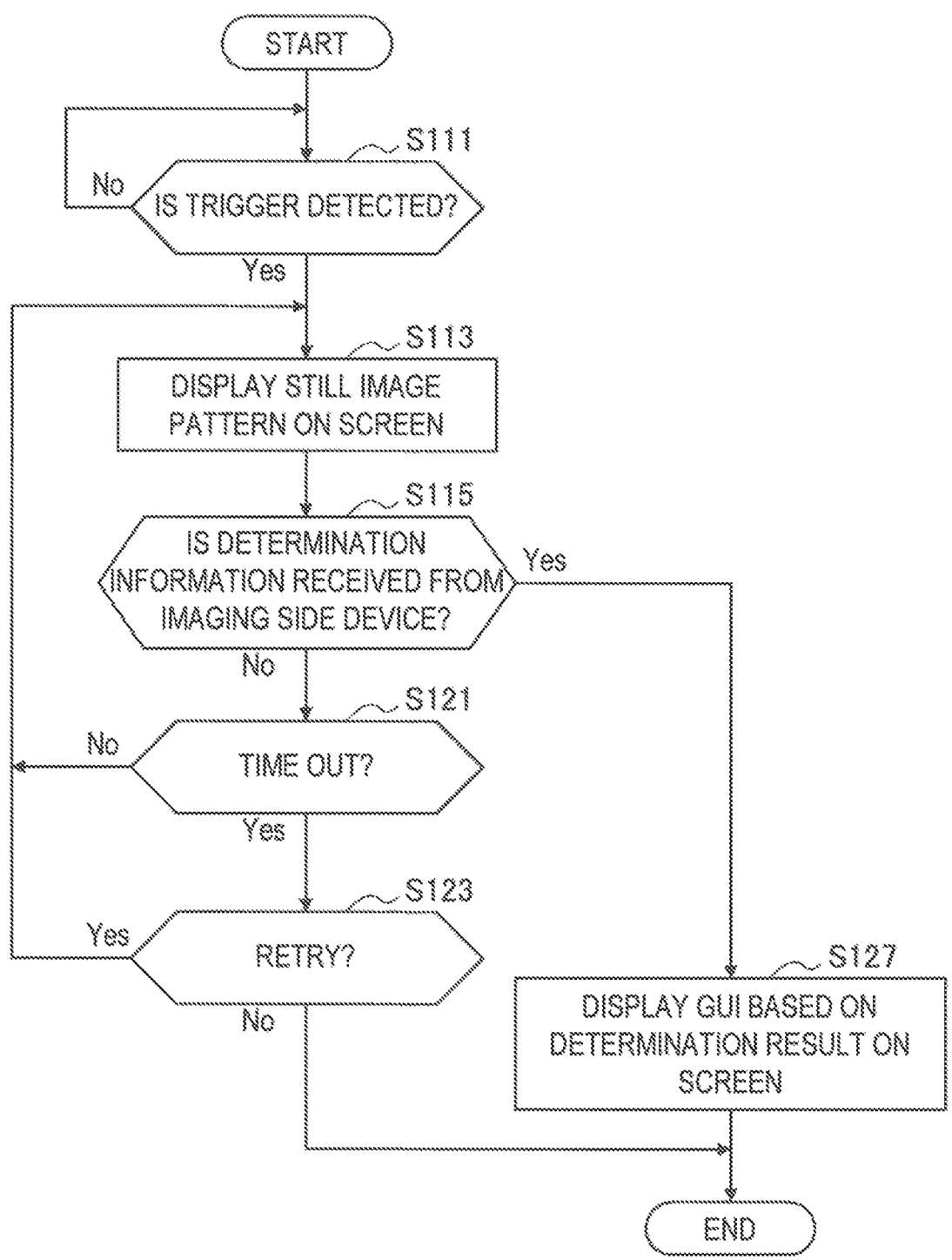

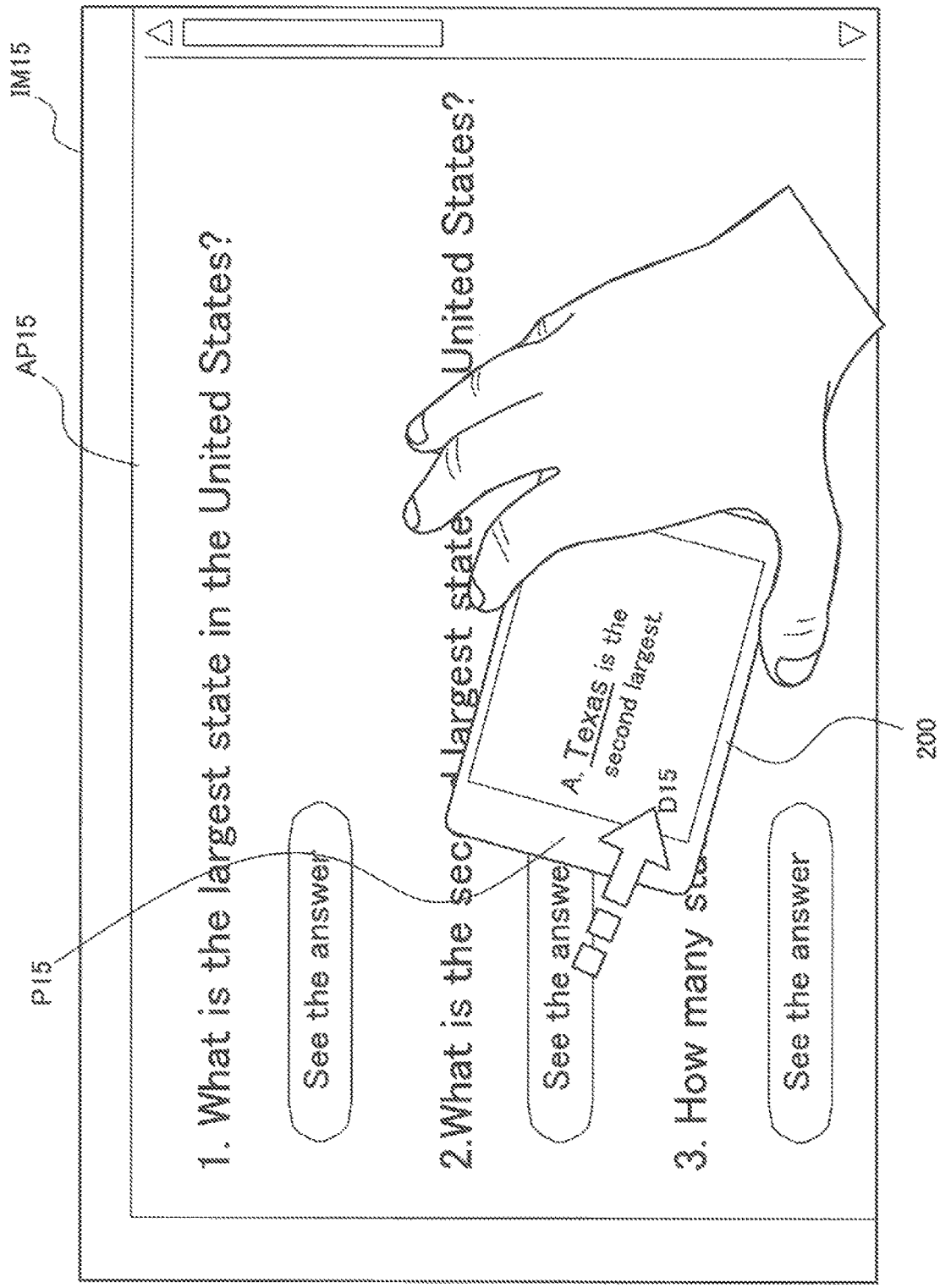

INFORMATION PROCESSING APPARATUS, INFORMATION PROCESSING METHOD, AND INFORMATION PROCESSING SYSTEM

CROSS REFERENCE TO RELATED APPLICATIONS

The present application is a continuation application of U.S. patent application Ser. No. 14/563,681, filed Dec. 8, 2014, which claims the benefit of priority from prior Japanese Priority Patent Application JP 2013-259106 filed Dec. 16, 2013, the entire contents of which are incorporated herein by reference.

BACKGROUND

The present disclosure relates to an information processing apparatus, a program, an information processing method and an information processing system.

In recent years, electronic devices with a high performance, represented by smart phones and tablet Personal Computers (PC), have become widespread. The usability of data coordination or user interface coordination between devices is one important concern for a user who possesses a plurality of these electronic devices. The same can be said for coordination between electronic devices respectively possessed by a plurality of users.

In the case where there are many interactions between electronic devices, the interactions are performed via a wireless link established between the devices. For example, JP 2011-164666A proposes technology which is capable of outputting instructions from an HMD device so as to transmit and receive data between two electronic devices reflected in an image captured by a Head Mounted Display (HMD) device. According to JP 2011-164666A, the device of a data transmission destination is selected based on the image captured by the HMD device and the direction of a user input (for example, a drag direction) on the device of a data transmission source.

SUMMARY

A number of electronic devices have a screen with a comparatively large size. For example, many screens of PCs and television apparatuses have a sufficient size for displaying various types of user interfaces. On the other hand, since the devices themselves of portable small-sized devices such as smart phones, digital cameras or game terminals can be easily moved by a user, it is possible for them to be used for a user input such as pointing (an operation which specifies a position), for example. However, existing technology does not provide a user interface which sufficiently utilizes features for each type of such devices. For example, the accuracy of pointing implemented by the technology proposed in JP 2011-164666A will be rough. Accordingly, this technology will not be suitable for the specification of a minute position (for example, the specification of an input position on the screen of a device).

Accordingly, it is desirable for the technology according to the present disclosure to provide an improved mechanism which can improve the usability of coordination between a plurality of electronic devices by more effectively utilizing features for each type of electronic device.

According to an embodiment of the present disclosure, there is provided an information processing apparatus, including a display control section which causes a prescribed pattern to be displayed on a screen in a state where a device having a camera is arranged so that the camera faces the screen, and a position acquisition section which acquires a relative position of the camera with respect to the screen determined based on an image of the pattern captured by the camera.

According to another embodiment of the present disclosure, there is provided a program for causing a processor which controls an information processing apparatus to function as causing a prescribed pattern to be displayed on a screen in a state where a device having a camera is arranged so that the camera faces the screen, and acquiring a relative position of the camera with respect to the screen determined based on an image of the pattern captured by the camera.

According to another embodiment of the present disclosure, there is provided an information processing method, in an information processing system which includes a first device having a screen and a second device having a camera, the method including causing a prescribed pattern to be displayed on the screen of the first device in a state where the second device is arranged so that the camera faces the screen, and acquiring a relative position of the camera with respect to the screen determined based on an image of the pattern captured by the camera.

According to another embodiment of the present disclosure, there is provided an information processing system including a first device having a screen, and a second device having a camera. The first device includes a display control section which causes a prescribed pattern to be displayed on the screen in a state where the second device is arranged so that the camera faces the screen, and the first device or the second device includes a position acquisition section which acquires a relative position of the camera with respect to the screen determined based on an image of the pattern captured by the camera.

According to an embodiment of the technology according to the present disclosure, by having a new mechanism of pointing between a device having a screen and a device having a camera, it becomes possible to improve the usability of coordination between these devices.

Note that, the above described effect is not necessarily limited, and any of the effects shown in the present disclosure, or other effects which can be understood from the present disclosure, may be accomplished along with the above described effect or instead of the above described effect.

BRIEF DESCRIPTION OF THE DRAWINGS

FIG. 5B is an explanatory diagram which shows an arrangement of logical functions of the display side device and the imaging side device in a second embodiment of the present disclosure;

FIG. 5C is an explanatory diagram which shows an arrangement of logical functions of the display side device and the imaging side device in a third embodiment of the present disclosure;

FIG. 11 is an explanatory diagram which shows a third example of a determination pattern;

FIG. 12 is an explanatory diagram which shows a fourth example of a determination pattern;

FIG. 13A is a flow chart which shows an example of the flow of processes of a determination phase of the display side device in the case where a still image pattern is used in the first embodiment;

FIG. 27 is an explanatory diagram which shows a first example of a pointing UI.

DETAILED DESCRIPTION OF THE EMBODIMENT(S)

Figure 1:
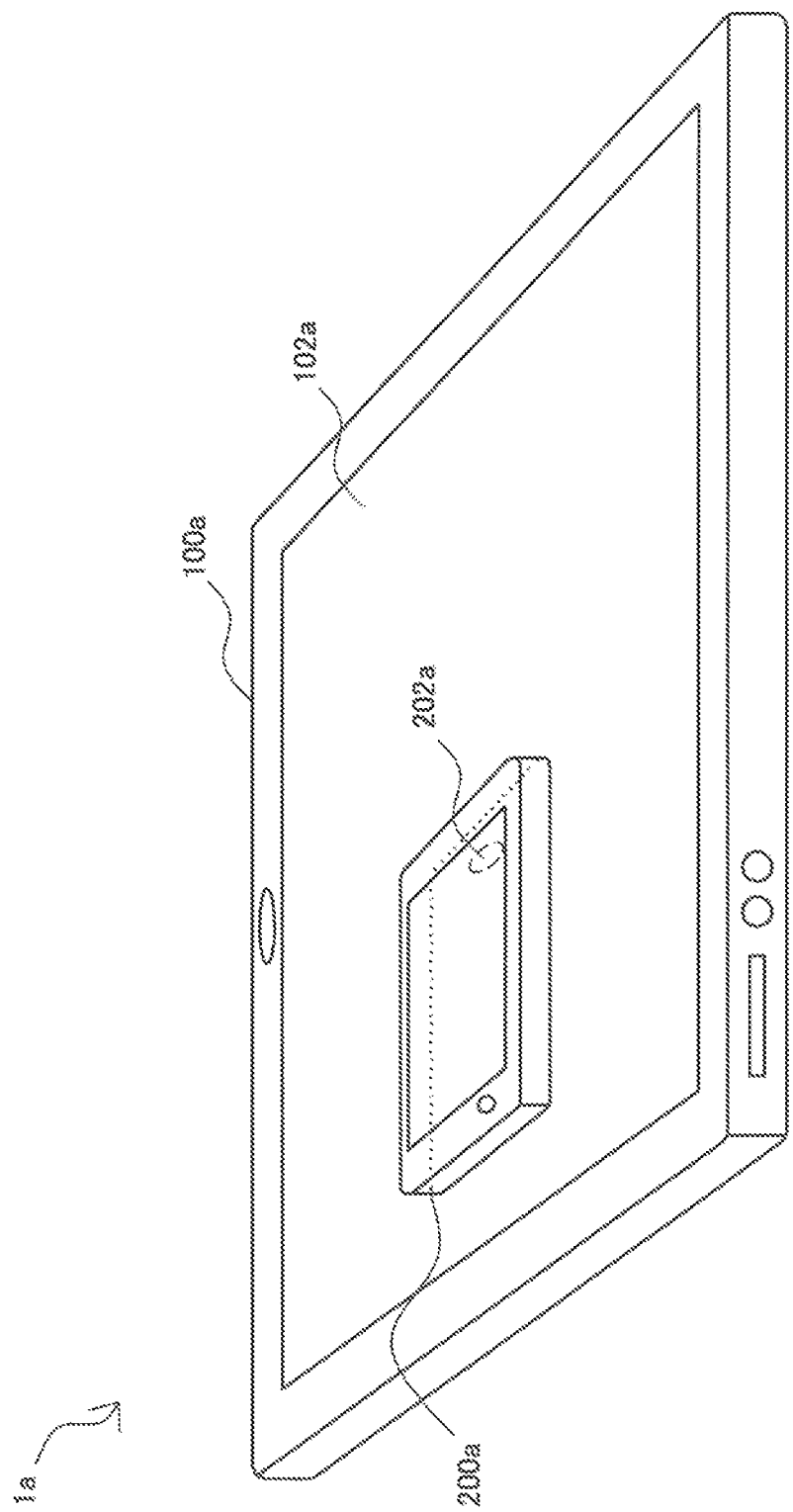
FIG. 1 is a first explanatory diagram for describing an outline of an information processing system.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Further, the description will be given in the following order.

1. Outline of the system
2. Hardware configuration examples
2-1. Display side device
2-2. Imaging side device
3. Arrangement of logical functions
4. Details of the preparation phase
5. Details of the determination phase
5-1. Examples of the determination pattern
5-2. Flow of position determination
6. Details of the UI processing phase
6-1. Data coordination
6-2. Pointing UI
7. Conclusion

1. OUTLINE OF THE SYSTEM

First, an outline of a system according to a first embodiment of the present disclosure will be described by using FIG. 1 and FIG. 2. FIG. 1 is a first explanatory diagram for describing an outline of an information processing system to which the technology according to the present disclosure can be applied. With reference to FIG. 1, an information processing system 1a includes a tablet PC 100a and a smart phone 200a.

The tablet PC 100a is an information processing apparatus which has a display 102a. The size of the screen of the display 102a is large to the extent that the smart phone 200a can be placed on at least the screen. The smart phone 200a is an information processing apparatus which has a camera 202a. The lens of the camera 202a is typically arranged on the back surface (the surface on the opposite side to the screen) of the smart phone 200a. The tablet PC 100a and the smart phone 200a collectively have a wireless communication interface (not illustrated), and can mutually communicate via a wireless link.

In the case where a plurality of electronic devices such as the tablet PC 100a and the smart phone 200a are present, the usability of data coordination or user interface coordination between devices will be one important concern for a user. The most primitive technique for coordinating user interfaces is to include a part for an input to a touch panel on the back surface of the smart phone 200a. For example, by including a projection formed with a material having electrical conductivity (for example, rubber, resin, metal or the like) on the back surface of the smart phone 200a, it becomes possible to perform an input to a touch panel with a number of systems such as an electrostatic capacity system or a pressure sensitivity system. However, this technique is merely enabling the smart phone 200a to be simply handled as an operation element such as a touch pen. Further, the inclusion of additional parts may not be desirable for a user.

On the other hand, according to the technology proposed by JP 2011-164666A, an image reflecting the tablet PC 100a and the smart phone 200a is captured by an HMD device, and data coordination between devices is implemented through image recognition based on this captured image. However, it will not necessarily be the case that a user will usually have an HMD device. Further, in image recognition based on a captured image of an HMD device which remotely captures electronic devices, pointing which becomes a key of a user interface may only be implemented with a low accuracy.

Here, an electronic device which has a screen with a comparatively large size, such as the tablet PC 100a, is suitable for displaying some user interface. On the other hand, since the device itself of a small-sized electronic device such as the smart phone 200a can be easily moved by a user, it is possible to perform a user input such as pointing. Accordingly, the technology according to the present disclosure utilizes these features in order to improve the usability of coordination between electronic devices.

More specifically, the smart phone 200a is placed on the tablet PC 100a, so that the camera 202a faces the screen of the tablet PC 100a. There may actually be some space present between the tablet PC 100a and the smart phone 200a. When the tablet PC 100a causes a prescribed pattern to be displayed on the screen, in such a state where the smart phone 200a is placed in the tablet PC 100a, the camera 202a captures the displayed pattern (or a part of this pattern). Then, the tablet PC 100a or the smart phone 200a acquires a relative position of the camera 202a with respect to the screen of the tablet PC 100a, by analyzing the captured pattern. Such an acquired relative position of the camera 202a is used for improving the usability of coordination between the tablet PC 100a and the smart phone 200a.

Figure 2:
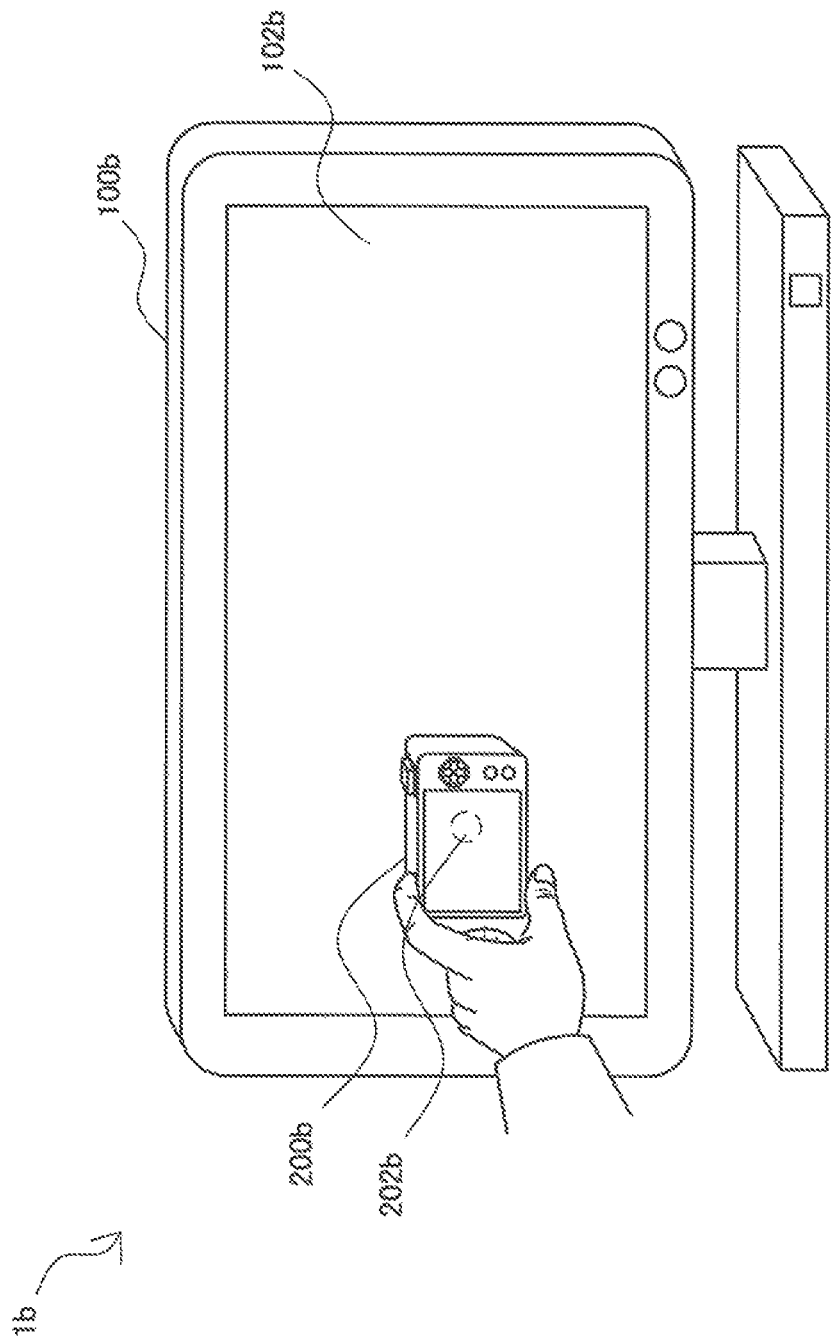
FIG. 2 is a second explanatory diagram for describing an outline of an information processing system.

FIG. 2 is a second explanatory diagram for describing an outline of an information processing system to which the technology according to the present disclosure can be applied. With reference to FIG. 2, an information processing system 1b includes a television apparatus 100b and a digital camera 200b.

The television apparatus 100b has a display 102b. The size of the screen of the display 102b is large compared to the digital camera 200b. The digital camera 200b has a lens 202b. The television apparatus 100b and the digital camera 200b collectively have a wireless communication interface (not illustrated), and can mutually communicate via a wireless link.

In the information processing system 1b, the digital camera 200b is held by a user, so that the lens 202b faces the screen of the television apparatus 100b. When the television apparatus 100b causes a prescribed pattern to be displayed on the screen, in such a state where the digital camera 200b is held, the digital camera 200b captures the displayed pattern (or a part of this pattern). Then, the television apparatus 100b or the digital camera 200b acquires a relative position of the lens 202b with respect to the screen of the television apparatus 100b, by analyzing the captured pattern. Such an acquired relative position is used for improving the usability of coordination between the television apparatus 100b and the digital camera 200b.

As described above, the technology according to the present disclosure is implemented by using a display side device which displays a prescribed pattern, and an imaging side device which captures this prescribed pattern displayed by the display side device. In the following description, the tablet PC 100a and the television apparatus 100b will be collectively called a display side device 100. The display side device 100 is not limited to the above described examples, and may be various types of arbitrary devices which have a screen with a comparatively large size, such as a notebook PC, a desktop PC, a table type terminal, a kiosk terminal or a navigation apparatus, for example. Further, the smart phone 200a and the digital camera 200b will be collectively called an imaging side device 200. The imaging side device 200 is not limited to the above described examples, and may be various types of arbitrary devices which have a camera, such as a pocket PC, a Personal Digital Assistant (PDA), a game terminal or an audio player, for example.

2. HARDWARE CONFIGURATION EXAMPLE

[2-1. Display Side Device]

Figure 3:
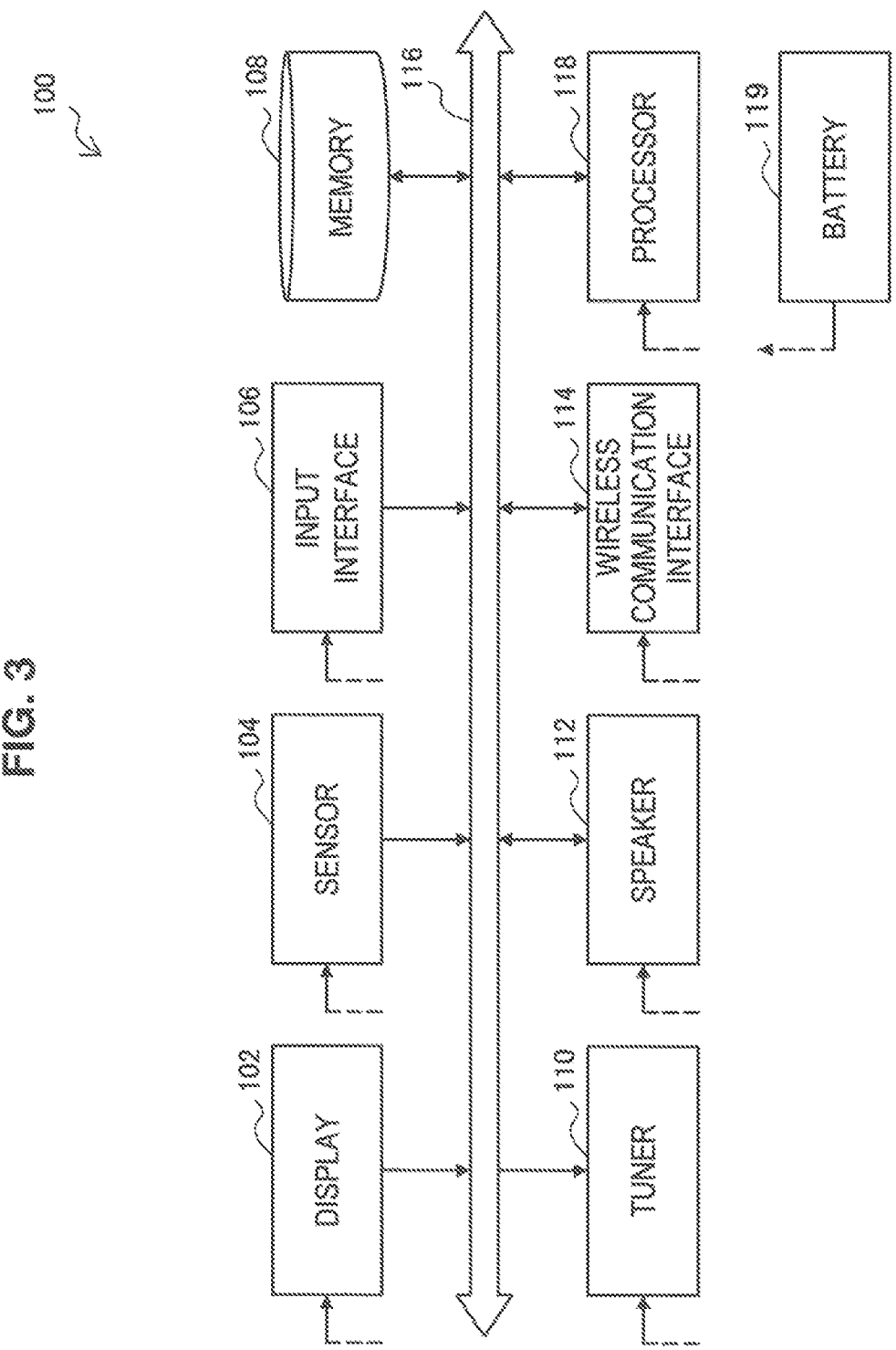
FIG. 3 is a block diagram which shows an example of a hardware configuration of a display side device.

FIG. 3 is a block diagram which shows an example of a hardware configuration of the display side device 100. With reference to FIG. 3, the display side device 100 includes a display 102, a sensor 104, an input interface 106, a memory 108, a tuner 110, a speaker 112, a wireless communication interface 114, a bus 116, a processor 118, and a battery 119.

(1) The Display

The display 102 is a display module such as a Liquid Crystal Display (LCD), an Organic Light-Emitting Diode (OLED) display, a Plasma Display Panel (PDP) or a Cathode Ray Tube (CRT). The display 102 includes a screen with a relatively large size compared to the imaging side device, and a display circuit. The display 102 may not be physically included in the same body with the display side device 100. For example, a module connected to the display side device 100 via connection terminals and signal lines (for example, cables for HDMI signals or RGB signals) may be treated as the display 102.

(2) The Sensor

The sensor 104 is a sensor module which can include various types of sensors such as an acceleration sensor, a measurement sensor, a gyro sensor and a magnetic field sensor. Sensor data generated by the sensor 104 may be used for various usages such as the detection of a user input or the detection of the imaging side device.

(3) The Input Interface

The input interface 106 is an input module used for a user to operate the display side device 100 or to input information to the display side device 100. The input interface 106 may include, for example, a touch panel which detects a touch to the screen of the display 102. Alternatively (or in addition to this), the input interface 106 may include various types of input devices other than this, such as buttons, switches, a keypad or a pointing device. Further, the input interface 106 may include an audio input module which recognizes, as a user input, audio commands from the voice of a user acquired via a microphone (not illustrated).

(4) The Memory

The memory 108 is constituted from a storage medium such as a semiconductor memory or a hard disc, and stores programs and data for the processes by the display side device 100. The data stored by the memory 108 can include sensor data, and profile data, content data and application data which will be described later. Note that, a part of the programs and data described in the present disclosure may not be stored by the memory 108, and may be acquired from an external data source (for example, a data server, a network storage, an external memory or the like).

(5) The Tuner

The tuner 110 extracts video signals of a desired channel included in broadcast signals received via an antenna from a broadcasting station. The channel of the video signals to be extracted by the tuner 110 can be selected in accordance with a user input acquired via the input interface 106. The display side device 100 can reproduce video content, by decoding the video signals output from the tuner 110.

(6) Speaker

The speaker 112 is an output module which outputs audio. The speaker 112 may be used for reproducing audio content. Further, the speaker 112 may be used for raising sound effect or warning sound at various timing, such as when a user's input is detected, when a wireless link is established, when an application is started up, or when data is transmitted or received.

(7) The Wireless Communication Interface

The wireless communication interface 114 is a communication module which mediates wireless communication between the display side device 100 and another device. The wireless communication interface 114 may execute wireless communication in accordance with an arbitrary wireless communication system, such as a near field wireless communication system such as Bluetooth (registered trademark), Near Field Communication (NFC), wireless USB or TransferJet (registered trademark), a cellular communication system such as WCDMA, WiMAX (registered trademark), LTE or LTE-A, or a wireless Local Area Network (LAN) system.

(8) The Bus

The bus 116 mutually connects the display 102, the sensor 104, the input interface 106, the memory 108, the tuner 110, the speaker 112, the wireless communication interface 114 and the processor 118.

(9) The Processor

The processor 118 is a control module which can correspond to a Central Processing Unit (CPU), a Digital Signal Processor (DSP), a Graphics Processing Unit (GPU) or a System-on-a-Chip (SoC). The processor 118 causes various logical functions of the display side device 100 to be operated, which will be described later, by executing programs stored in the memory 108 or another storage medium by using a control circuit.

(10) The Battery

The battery 119 supplies power to each of the blocks of the display side device 100 shown in FIG. 3, via power supply lines partially shown by dotted lines. The supply of power from the battery 119 to each of the blocks can be started or ended, for example, in the case where a power supply button included in the housing of the display side device 100 is pressed. The battery 119 may be capable of being removed from the housing of the display side device 100.

Note that, the display side device 100 may not have part of the configuration described by using FIG. 3, or may have an additional configuration. For example, in the case where it is possible for the display side device 100 to be connected to an external power supply (for example, a commercial power supply), the battery 119 may be omitted from the configuration of the display side device 100. Further, a single-chip information processing module integrating all or part of the configuration described by using FIG. 3 may be provided.

[2-2. Imaging Side Device]

Figure 4:
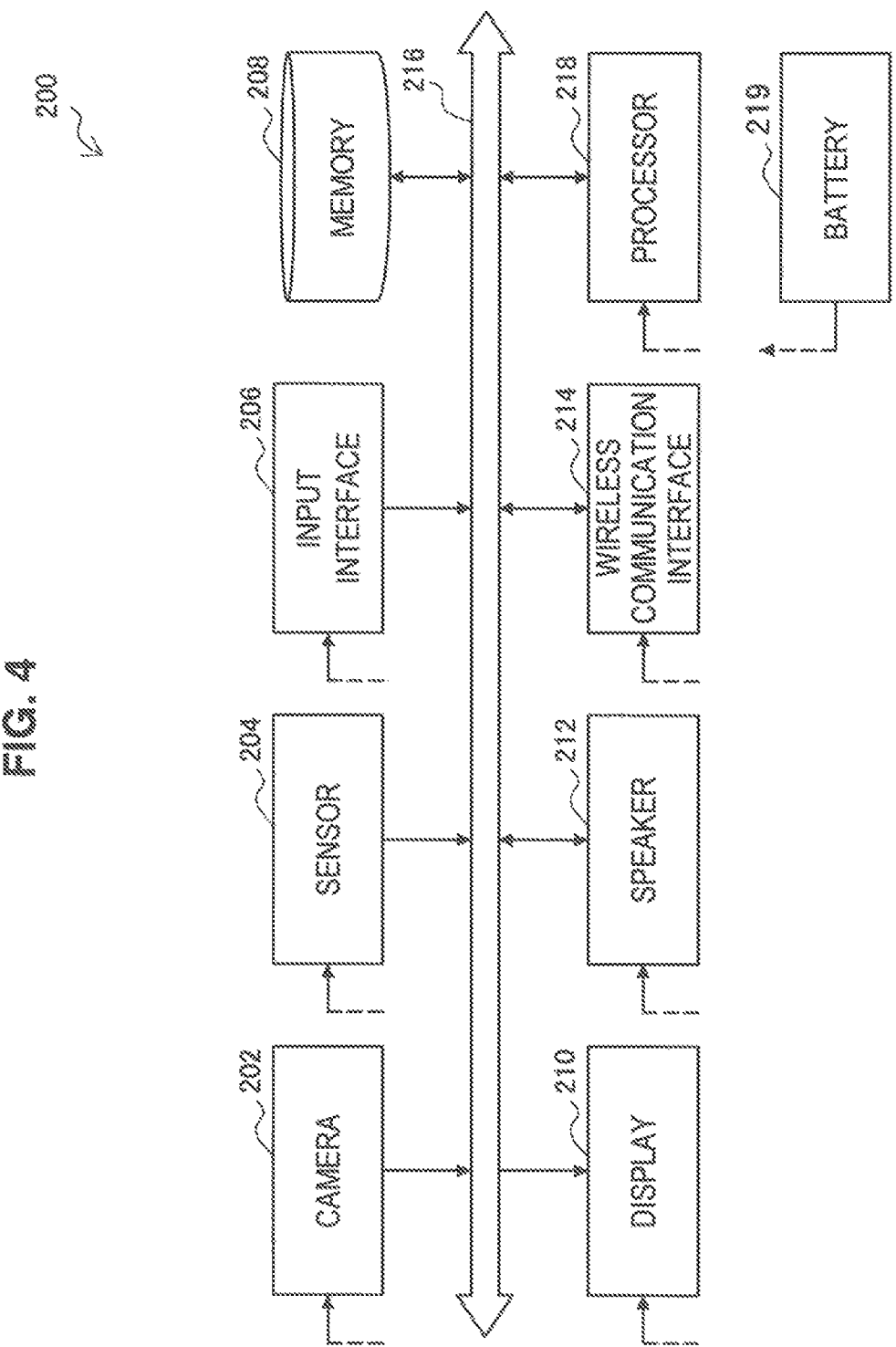
FIG. 4 is a block diagram which shows an example of a hardware configuration of an imaging side device.

FIG. 4 is a block diagram which shows an example of a hardware configuration of the imaging side device 200. With reference to FIG. 4, the imaging side device 200 includes a camera 202, a sensor 204, an input interface 206, a memory 208, a display 210, a speaker 212, a wireless communication interface 214, a bus 216, a processor 218, and a battery 219.

(1) The Camera

The camera 202 is an imaging module which captures an image by using an imaging element such as a Charge Coupled Device (CCD) or a Complementary Metal Oxide Semiconductor (CMOS). The camera 202 includes a lens, a group of the above described imaging elements, and an imaging circuit. The lens of the camera 202 can typically be arranged on the back surface of the imaging side device 200. Captured images generated by the camera 202 may be still images, or may be each of a series of frames which constitute a moving image.

(2) The Sensor

The sensor 204 is a sensor module which can include various types of sensors such as an acceleration sensor, a measurement sensor, a gyro sensor and a magnetic field sensor. Sensor data generated by the sensor 204 may be used for various usages such as the detection of a user input or the detection of the displaying side device.

(3) The Input Interface

The input interface 206 is an input module used for a user to operate the imaging side device 200 or to input information to the imaging side device 200. The input interface 206 may include, for example, a touch panel which detects a touch to the screen of the display 210. Alternatively (or in addition to this), the input interface 206 may include various types of input devices other than this, such as buttons, switches, a keypad or a pointing device. Further, the input interface 206 may include an audio input module which recognizes, as a user input, audio commands from the voice of a user acquired via a microphone (not illustrated).

(4) The Memory

The memory 208 is constituted from a storage medium such as a semiconductor memory or a hard disc, and stores programs and data for the processes by the imaging side device 200. The data stored by the memory 208 can include captured image data, sensor data, and profile data, content data and application data which will be described later. Note that, a part of the programs and data described in the present disclosure may not be stored by the memory 208, and may be acquired from an external data source.

(5) The Display

The display 210 is a display module such as an LCD or an OLED display. The display 210 includes a screen and a display circuit.

(6) Speaker

The speaker 212 is an output module which outputs audio. The speaker 212 may be used for reproducing audio content. Further, the speaker 212 may be used for raising sound effect or warning sound at various timing, such as when a user's input is detected, when a wireless link is established, when an application is started up, or when data is transmitted or received.

(7) The Wireless Communication Interface

The wireless communication interface 214 is a communication module which mediates wireless communication between the imaging side device 200 and another device. The wireless communication interface 214 may execute wireless communication in accordance with an arbitrary wireless communication system, such as a near field wireless communication system such as Bluetooth (registered trademark), Near Field Communication (NFC), wireless USB or TransferJet (registered trademark), a cellular communication system such as WCDMA, WiMAX (registered trademark), LTE or LTE-A, or a wireless Local Area Network (LAN) system.

(8) The Bus

The bus 216 mutually connects the camera 202, the sensor 204, the input interface 206, the memory 208, the display 210, the speaker 212, the wireless communication interface 214 and the processor 218.

(9) The Processor

The processor 218 is a control module which can correspond to a Central Processing Unit (CPU), a Digital Signal Processor (DSP), a Graphics Processing Unit (GPU) or a System-on-a-Chip (SoC). The processor 218 causes various logical functions of the imaging side device 200 to be operated, which will be described later, by executing programs stored in the memory 108 or another storage medium by using a control circuit.

(10) The Battery

The battery 219 supplies power to each of the blocks of the imaging side device 200 shown in FIG. 4, via power supply lines partially shown by dotted lines. The supply of power from the battery 219 to each of the blocks can be started or ended, for example, in the case where a power supply button included in the housing of the imaging side device 200 is pressed. The battery 219 may be capable of being removed from the housing of the imaging side device 200.

Note that, the imaging side device 200 may not have part of the configuration described by using FIG. 4, or may have an additional configuration. Further, a single-chip information processing module integrating all or part of the configuration described by using FIG. 4 may be provided.

3. ARRANGEMENT OF LOGICAL FUNCTIONS

In this section, examples of the arrangement of logical functions of the display side device 100 and the imaging side device 200 will be described by using FIG. 5A to FIG. 5C. In the present embodiment, the functions of these two devices are classified into functions of a preparation phase, functions of a determination phase, and functions of a user interface (UI) processing phase. A number of the functions are arranged in the display side device 100 in some embodiment, and a number of the functions are arranged in the imaging side device 200 in another embodiment.

(1) The First Embodiment

Figure 5A:
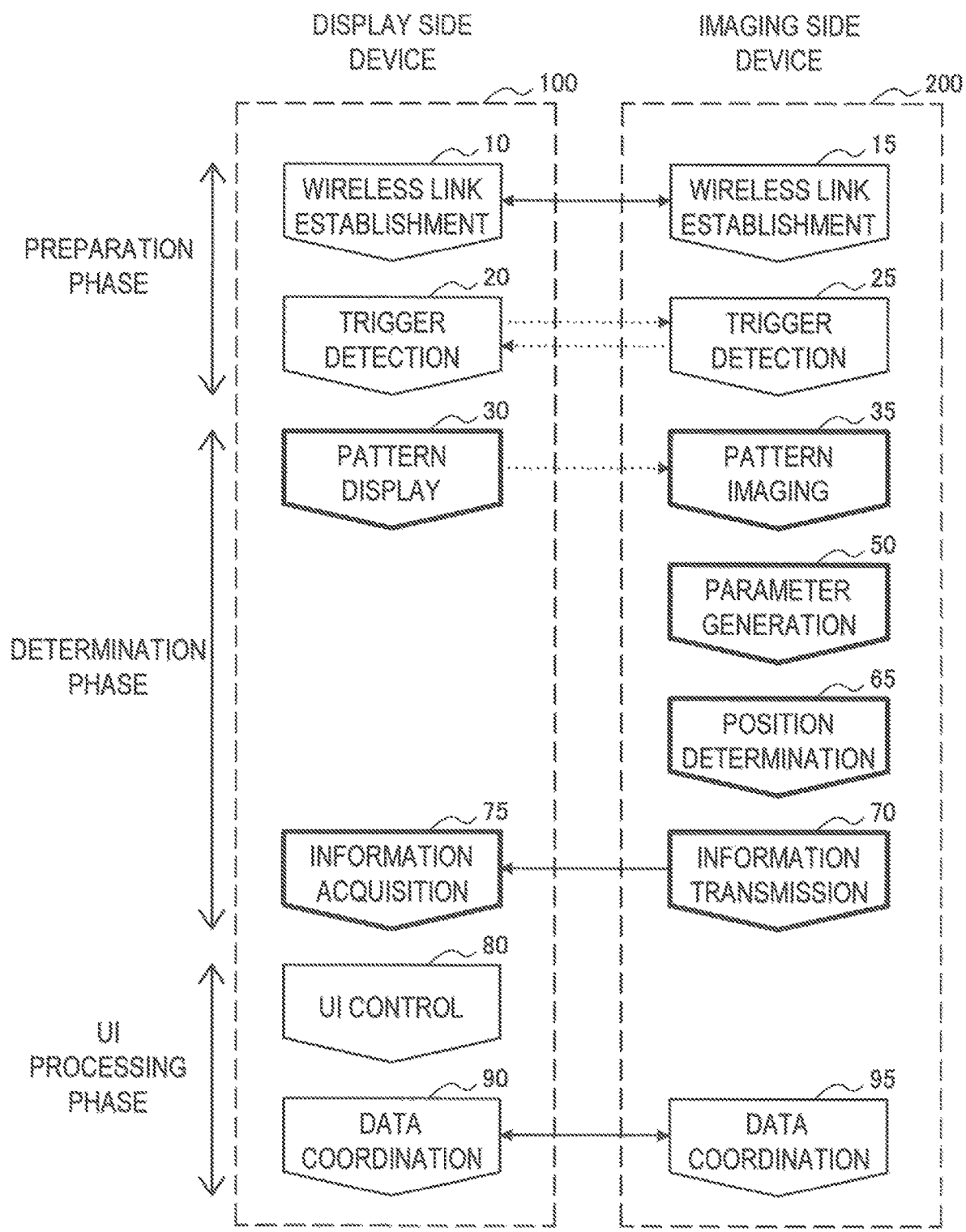
FIG. 5A is an explanatory diagram which shows an arrangement of logical functions of the display side device and the imaging side device in a first embodiment of the present disclosure.

FIG. 5A is an explanatory diagram which shows an arrangement of logical functions of the display side device and the imaging side device in a first embodiment of the present disclosure. With reference to FIG. 5A, for the preparation phase, the display side device 100 has a wireless link establishment function 10 and a trigger detection function 20. The imaging side device 200 has a wireless link establishment function 15 and a trigger detection function 25. Further, for the determination phase, the display side device 100 has a pattern display function 30 and an information acquisition function 75. The imaging side device 200 has a pattern imaging function 35, a parameter generation function 50, a position determination function 65 and an information transmission function 70. Further, for the UI processing phase, the display side device 100 has a UI control function 80 and a data coordination function 90. The imaging side device 200 has a data coordination function 95.

In the preparation phase, a wireless link is established between the wireless link establishment function 10 of the display side device 100 and the wireless link establishment function 15 of the imaging side device 200. Further, a determination start trigger is detected, by at least one of the trigger detection function 20 of the display side device 100 and the trigger detection function 25 of the imaging side device 200. The establishment of a wireless link may be performed after the detection of the determination start trigger. At the same time as when the determination start trigger is detected, the display side device 100 and the imaging side device 200 are assumed to be arranged so that the camera 202 of the imaging side device 200 faces the screen of the display 102 of the display side device 100. Then, in accordance with the detection of the determination start trigger, the display side device 100 and the imaging side device 200 start the processes of the determination phase for determining a relative position of the imaging side device 200.

In the determination phase, the pattern display function 30 of the display side device 100 causes a prescribed determination pattern to be displayed on the screen of the display 102. The determination pattern may be a still image, or may be a moving image. A number of specific examples of the determination pattern will be additionally described later. The pattern imaging function 35 of the imaging side device 200 captures the determination pattern displayed by the display side device 100 by using the camera 202. The parameter generation function 50 of the imaging side device 200 generates parameters for determining a relative position (of the lens) of the camera 202 with respect to the screen of the display side device 100, based on the captured image of the determination pattern. The parameter generation function 50 may additionally generate parameters for determining a rotation amount of the camera 202 in a plane parallel to the screen of the display side device 100, based on the captured image of the determination pattern. Further, the position determination function 65 of the imaging side device 200 determines the above described relative position of the camera 202, by using the parameters generated by the parameter generation function 50. The position determination function 65 may additionally determine the above described rotation amount of the camera 202. The information transmission function 70 of the imaging side device 200 transmits a determination result showing the relative position (and rotation amount) determined by the position determination function 65 to the display side device 100 via the wireless communication interface 214. The information acquisition function 75 of the display side device 100 acquires the determination result transmitted from the imaging side device 200 via the wireless communication interface 114. The determination result acquired here includes position data which shows the relative position of the camera 202 with respect to the screen of the display side device 100. This determination result may additionally include rotation amount data which shows the above described rotation amount of the camera 202.

In the UI processing phase, the UI control function 80 of the display side device 100 generates display control signals, based on the relative position of the camera 202 acquired by the information acquisition function 75. The display control signals generated here are signals for controlling the display of the screen of the display 102, for example, and can be output to the display 102. As a result of this, a Graphical User Interface (GUI) based on the relative position of the camera 202 is displayed on the screen of the display 102. The GUI displayed here may be additionally based on the rotation amount of the camera 202 acquired by the information acquisition function 75. A number of examples of the GUI will be additionally described later. Further, the display control signals generated by the UI control function 80 may be signals for controlling the display of the screen of the display 210 of the imaging side device 200, and can be transmitted from the wireless communication interface 114 to the imaging side device 200. As a result of this, a GUI based on the relative position of the camera 202 is displayed on the screen of the display 210 of the imaging side device 200.

In the UI processing phase, the data coordination function 90 of the display side device 100 and the data coordination function 95 of the imaging side device 200 may transmit or receive, on a wireless link between the devices, content data selected based on the relative position of the camera 202 acquired by the information acquisition function 75. For example, the data coordination function 90 of the display side device 100 may select content on the screen pointed at by the relative position of the camera 202, and may transmit content data of the selected content to the imaging side device 200 via the wireless communication interface 114. The content data transmitted here may be various types of arbitrary data, such as image data, audio data, video data, game data or link data showing a link of a Web page which can be described by HyperText Markup Language (HTML), for example. The data coordination function 95 of the imaging side device 200 can reproduce (for example, display content on a screen) or store the content data received from the display side device 100 via the wireless communication interface 214.

(2) The Second Embodiment

FIG. 5B is an explanatory diagram which shows an arrangement of logical functions of the display side device and the imaging side device in a second embodiment of the present disclosure. The arrangement of functions for the preparation phase and the UI processing phase in the second embodiment are the same as those of the first embodiment. For the determination phase, the display side device 100 has a pattern display function 30, a parameter acquisition function 60 and a position determination function 65. The imaging side device 200 has a pattern imaging function 35, a parameter generation function 50 and a parameter transmission function 55.

In the determination phase, the pattern display function 30 of the display side device 100 causes a prescribed determination pattern to be displayed on the screen of the display 102. The determination pattern may be a still image, or may be a moving image. The pattern imaging function 35 of the imaging side device 200 captures the determination pattern displayed by the display side device 100 by using the camera 202. The parameter generation function 50 of the imaging side device 200 generates parameters for determining a relative position of the camera 202 with respect to the screen of the display side device 100, based on the captured image of the determination pattern. The parameter generation function 50 may additionally generate parameters for determining a rotation amount of the camera 202 in a plane parallel to the screen of the display side device 100, based on the captured image of the determination pattern. The parameter transmission function 55 of the imaging side device 200 transmits the parameters generated by the parameter generation function 50 to the display side device 100 via the wireless communication interface 214. The parameter acquisition function 60 of the display side device 100 acquires the parameters transmitted from the imaging side device 200 via the wireless communication interface 114. The position determination function 65 of the display side device 100 determines the above described relative position of the camera 202 of the imaging side device 200, by using the parameters acquired by the parameter acquisition function 60. The position determination function 65 may additionally determine the above described rotation amount of the camera 202.

(3) The Second Embodiment

FIG. 5C is an explanatory diagram which shows an arrangement of logical functions of the display side device and the imaging side device in a third embodiment of the present disclosure. The arrangement of functions for the preparation phase and the UI processing phase in the third embodiment are the same as those of the first embodiment and the second embodiment. For the determination phase, the display side device 100 has a pattern display function 30, an image acquisition function 45, a parameter generation function 50 and a position determination function 65. The imaging side device 200 has a pattern imaging function 35 and an image transmission function 40.

In the determination phase, the pattern display function 30 of the display side device 100 causes a prescribed determination pattern to be displayed on the screen of the display 102. The determination pattern may be a still image, or may be a moving image. The image transmission function 40 of the imaging side device 200 transmits the captured image which reflects the determination pattern to the display side device 100 via the wireless communication interface 214. The image acquisition function 45 of the display side device 100 acquires the captured image transmitted from the imaging side device 200 via the wireless communication interface 114. The parameter generation function 50 of the display side device 100 generates parameters for determining a relative position of the camera 202 with respect to the screen of the display side device 100, based on the captured image of the determination pattern acquired by the image acquisition function 45. The parameter generation function 50 may additionally generate parameters for determining a rotation amount of the camera 202 in a plane parallel to the screen of the display side device 100, based on the captured image of the determination pattern. The position determination function 65 of the display side device 100 determines the above described relative position of the camera 202 of the imaging side device 200, by using the parameters generated by the parameter generation function 50. The position determination function 65 may additionally determine the above described rotation amount of the camera 202.

4. DETAILS OF THE PREPARATION PHASE

In this section, the details of the processes executed in the above described preparation phase will be described. In the preparation phase, the establishment of a wireless link and the detection of a determination start trigger are mainly performed.

(1) Establishment of a Wireless Link

For example, the wireless communication interface 114 of the display side device 100 can detect the imaging side device 200 which is positioned nearby, in accordance with a prescribed user input or automatically. Alternatively, the wireless communication interface 214 of the imaging side device 200 may detect the display side device 100. Then, a wireless link is established between the display side device 100 and the imaging side device 200, via a procedure such as an exchange of terminal information and cross certification. The wireless link between the display side device 100 and the imaging side device 200 may be a direct link, or may be an indirect link via another node such as a wireless access point. For example, Universal Plug and Play (UPnP) automatic setting technology may be utilized, at the time of the establishment of a wireless link (for example, refer to JP 2006-128737).

In the preparation phase, information to be used in the following determination phase and UI processing phase may be exchanged between the devices. For example, the imaging side device 200 may provide identification information, which identifies one or more patterns supported by themselves from among a plurality of candidates of determination patterns, to the display side device 100. In this case, the pattern display function 30 of the display side device 100 causes a selected determination pattern to be displayed on the screen, by selecting the determination pattern supported by the imaging side device 200 based on this identification information.

Figure 6:
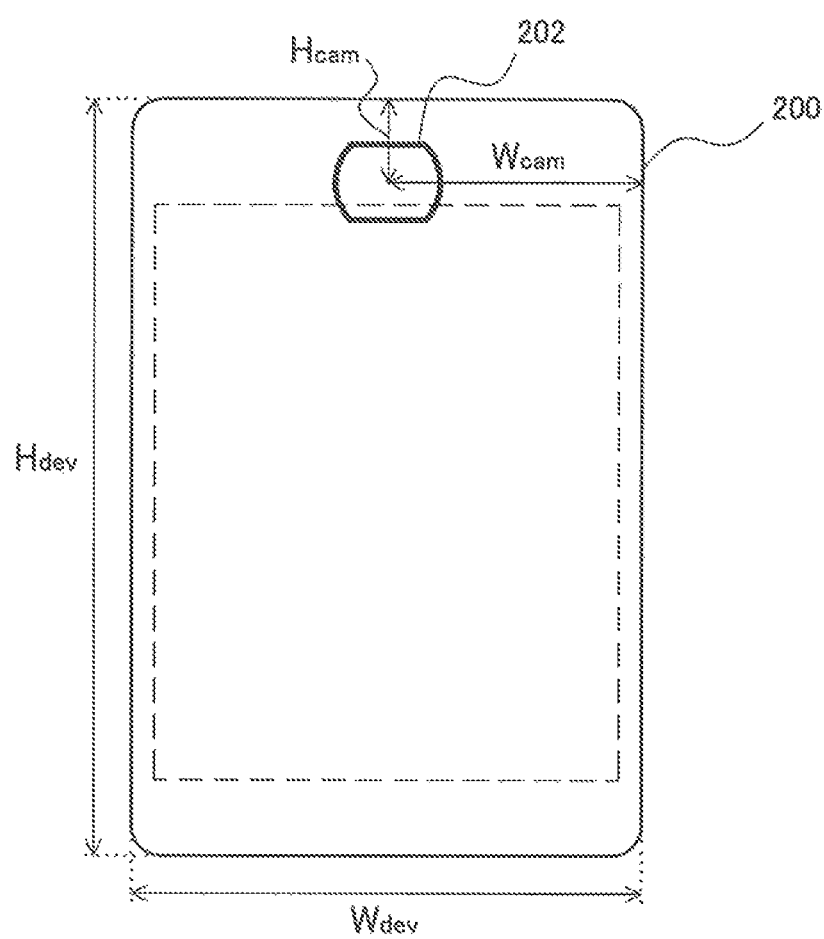
FIG. 6 is an explanatory diagram for describing profile data which can be defined for the imaging side device.

Further, the imaging side device 200 may provide profile data, which defines the arrangement of the camera 202 in the imaging side device 200, to the display side device 100. As an example, as shown in FIG. 6, the profile data can show a width Wdev and a height Hdev of the housing of the imaging side device 200, a distance Wcam from the long side of the housing up to the optical axis of the camera 202, and a distance Hcam from the short side of the housing up to the optical axis of the camera 202. When a GUI based on the relative position and the rotation amount of the camera 202 is displayed on the screen by the display side device 100, such as that which will be described later, the profile data can be used for determining the arrangement of this GUI. Note that, the profile data of a plurality of various types of devices may be stored by the memory 108 of the display side device 100 in advance. In this case, the display side device 100 can select appropriate profile data to be used for the imaging side device 200, based on terminal information (for example, a serial number of the terminal or the like) received from the imaging side device 200.

(2) Detection of a Determination Start Trigger

The trigger detection function 20 of the display side device 100 may detect, as a determination start trigger, various types of prescribed user input (for example, a touch to the screen, pressing of a button arranged on the housing, or recognition of a specific audio command) acquired via the input interface 106. When a determination start trigger is detected by the trigger detection function 20, the display side device 100 can notify the detection of a trigger to the imaging side device 200. Similarly, the trigger detection function 25 of the imaging side device 200 may detect, as a determination start trigger, various types of prescribed user input acquired via the input interface 206. When a determination start trigger is detected by the trigger detection function 25, the imaging side device 200 can notify the detection of a trigger to the display side device 100.

Further, the trigger detection function 20 of the display side device 100 may detect, as a determination start trigger, a sensor input acquired via the sensor 104. Similarly, the trigger detection function 25 of the imaging side device 200 may detect, as a determination start trigger, a sensor input acquired via the sensor 204. The sensor input here is sensor data which shows, for example, that the imaging side device 200 is in contact with the screen of the display side device 100. As an example, when the imaging side device 200 is placed on the screen of the display side device 100, sensor data of acceleration sensors of these devices can collectively show a peak at the moment of placement. The trigger detection functions 20 and 25 may determine that the imaging side device 200 is in contact with the screen of the display side device 100, based on such a peak of the sensor data (or a temporally matching of peaks). In this way, the determination phase can be started by synchronizing the timing of the two devices, even if there is no specific user input.

The determination phase may be started in accordance with the detection of the above described determination start trigger by either one of the display side device 100 and the imaging side device 200. Alternatively, the determination phase may be started in accordance with the detection of the above described determination start trigger by both of the display side device 100 and the imaging side device 200 (for example, a touch to the screens of the two devices by a user).

5. DETAILS OF THE DETERMINATION PHASE

In this section, the details of the processes executed in the above described determination phase will be described. In the determination phase, the determination pattern displayed by the display side device 100 is captured by the imaging side device 200, and a relative position (and rotation amount) of the camera 202 of the imaging side device 200 is determined from parameters generated based on the captured image of the determination pattern.

5.1. Examples of the Determination Pattern (1) First Example

Figure 7:
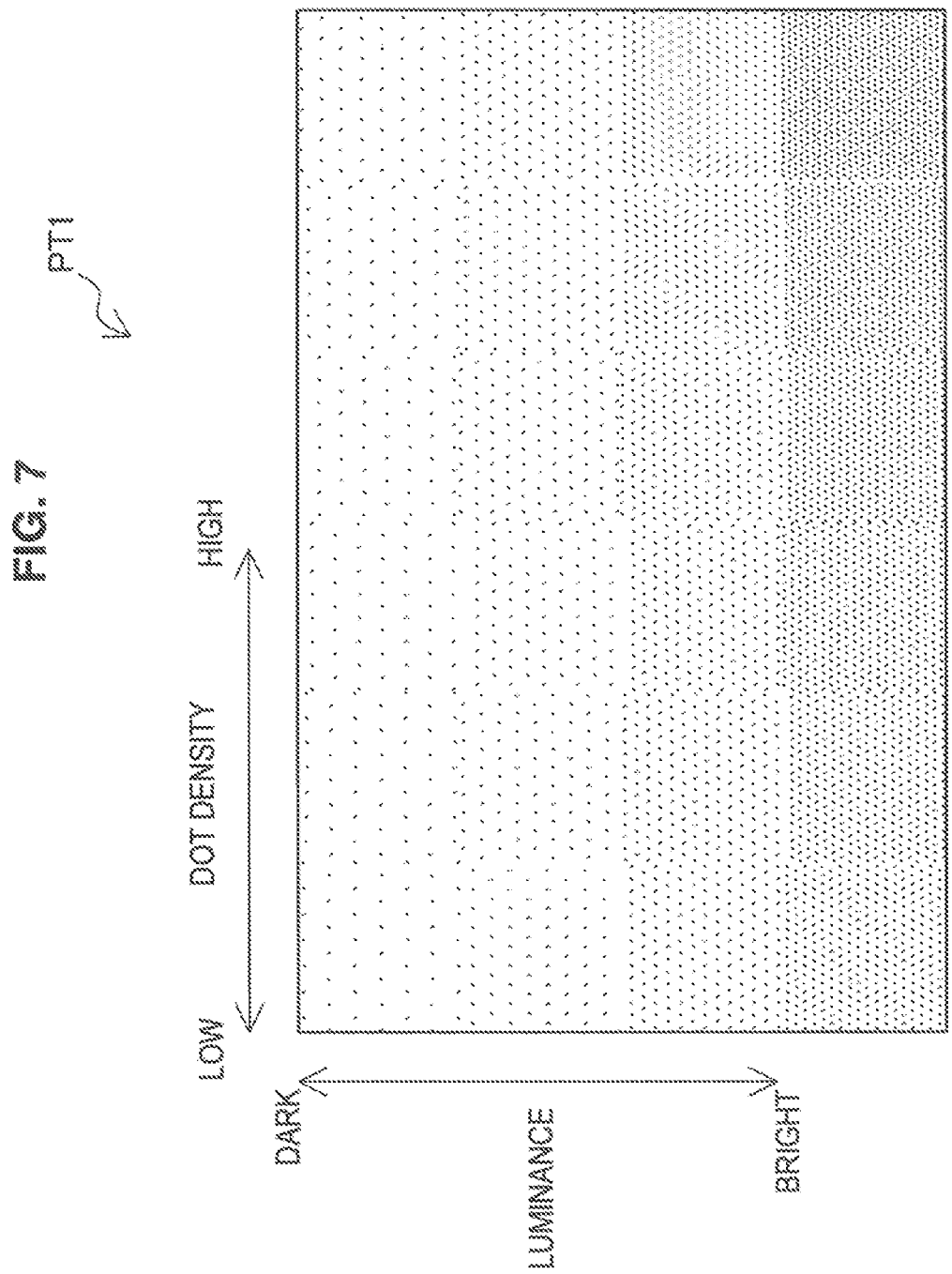
FIG. 7 is an explanatory diagram which shows a first example of a determination pattern.
Figure 8:
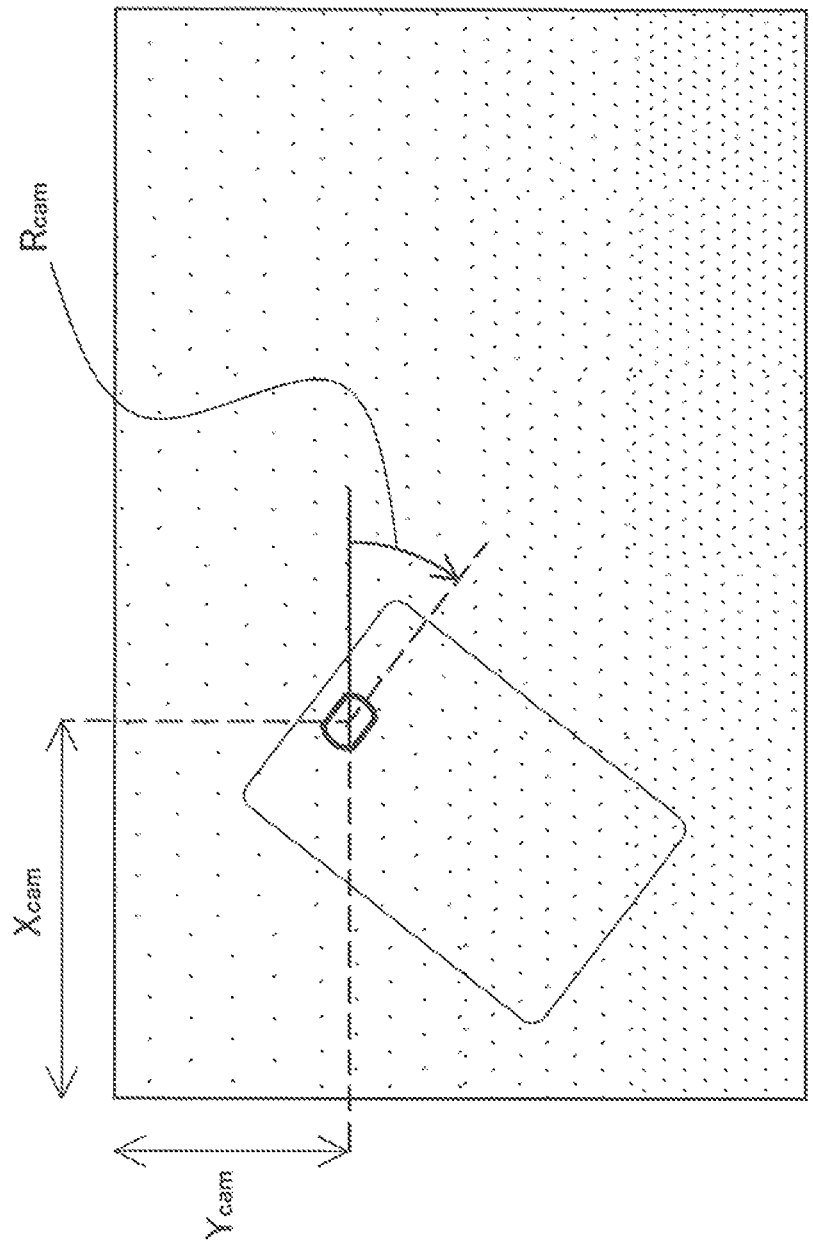
FIG. 8 is an explanatory diagram for describing the determination of a relative position and a rotation amount of a camera based on the first example of a determination pattern.

FIG. 7 is an explanatory diagram which shows a first example of a determination pattern. In the first example, the determination pattern is a still image having image characteristics which change depending on the position. The image characteristics here may be, for example, luminance, color tone, transparency, dot density, or a combination of these. A determination pattern PT1 shown in FIG. 7 is a still image having a dot density increasing with movement to the right, and having a luminance brighter with movement to the bottom. Only a local part of the determination pattern PT1 displayed on the screen is reflected in an image captured by the camera 202, in a state in which the camera 202 faces the screen of the display side device 100 while the imaging side device 200 is placed on this screen or is brought near to the this screen. The parameter generation function 50 generates parameters which show the values of image characteristics determined from this captured image. The position determination function 65 can determine coordinates, which are a relative position of the camera 202, mapped (in a screen coordinate system of the display side device 100) to the values of the image characteristics shown by the parameters generated by the parameter generation function 50. Further, for example, the parameter generation function 50 generates parameters which show the direction of a change of values of the image characteristics determined from the captured image (for example, the direction in which the rate of change is the largest or smallest). The position determination function 65 can determine a relative rotation amount of the camera 202, based on the direction shown by the parameters generated by the parameter generation function 50. In the example of FIG. 8, the relative position of the camera 202 is determined to be the coordinates (Xcam, Ycam), based on the dot density and luminance determined from the captured image locally capturing the determination pattern PT1. Further, the rotation amount of the camera 202 is determined to be an angle Rcam, based on the direction of the change of dot density and luminance determined from the captured image.

Note that, the determination pattern may not be a visible (or being able to be recognized by a user through sight) pattern. For example, a pattern such as a digital watermark having image characteristics which change depending on the position, or a pattern constituted by infrared light, may be used as the determination pattern. Further, a determination pattern combined with image (or video) content may also be used.

(2) Second Example

Figure 9:
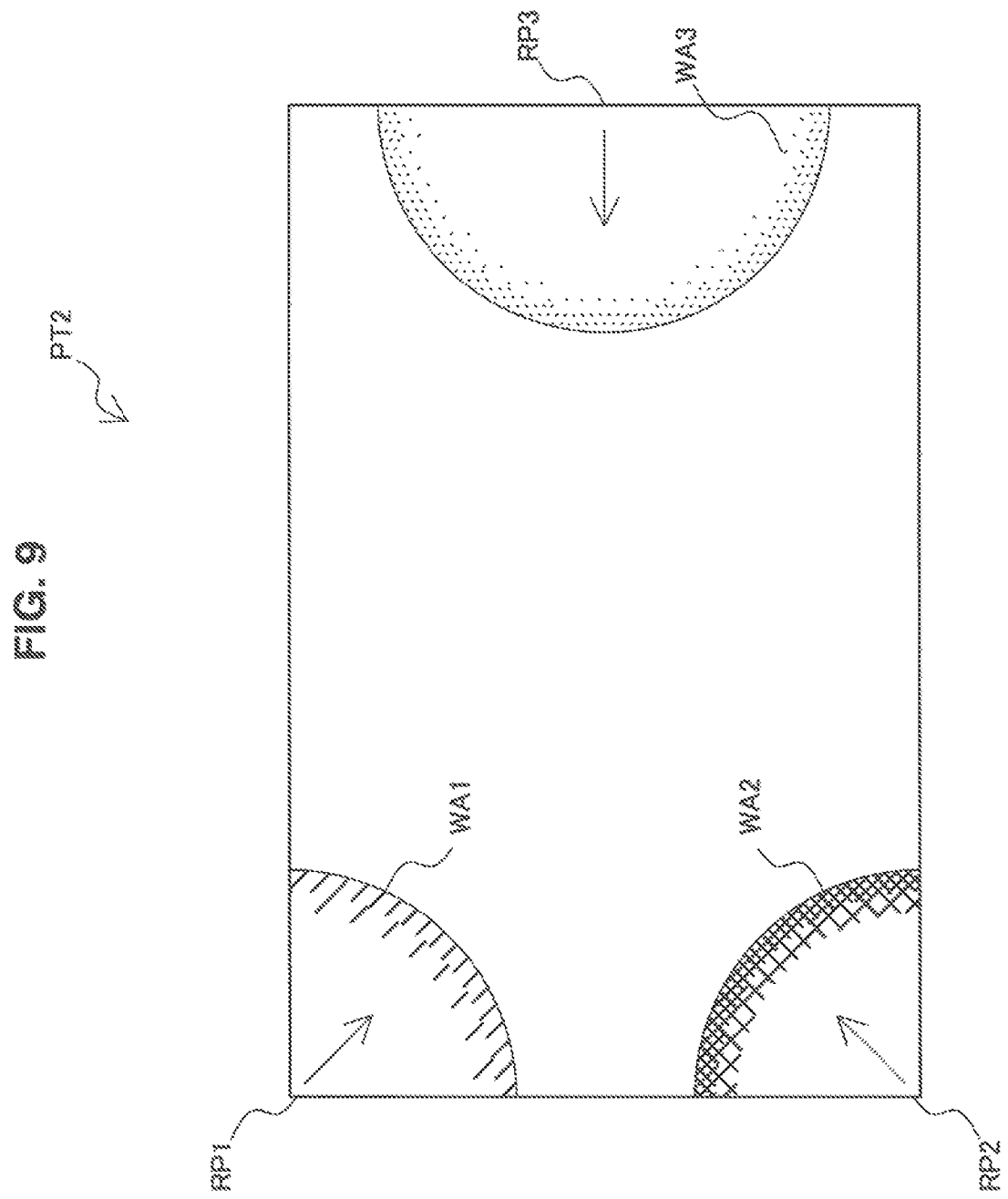
FIG. 9 is an explanatory diagram which shows a second example of a determination pattern.

In a second, third and fourth examples of a determination pattern, the determination pattern is a moving image which displays one or more display objects moving in accordance with time on the screen of the display side device 100. FIG. 9 is an explanatory diagram which shows a second example of a determination pattern. In the second example, the determination pattern displays ripple objects respectively originating from at least two reference positions. More specifically, with reference to FIG. 9, a determination pattern PT2 displays a ripple object WA1 originating from a top left reference point RP1 and extending in accordance with time in the lower right direction, a ripple object WA2 originating from a lower left reference point RP2 and extending in accordance with time in the upper right direction, and a ripple object WA3 originating from a right center reference point RP3 and extending in accordance with time in the left direction. The parameter generation function 50 respectively measures the arrival times of these ripple objects to the camera 202, and generates parameters which show the measured arrival times. The position determination function 65 determines a relative position of the camera 202, by using the arrival times shown by the parameters generated by the parameter generation function 50. Further, each of the ripple objects have a gradient of shading (or an image characteristic other than this) along a radial direction in this edge part. The parameter generation function 50 can generate parameters which show the directions of the gradient of shading determined from a captured image when each of the ripple objects arrive at the camera 202. The position determination function 65 can determine a relative rotation amount of the camera 202, based on the directions of the gradient shown by the parameters generated by the parameter generation function 50.

Figure 10:
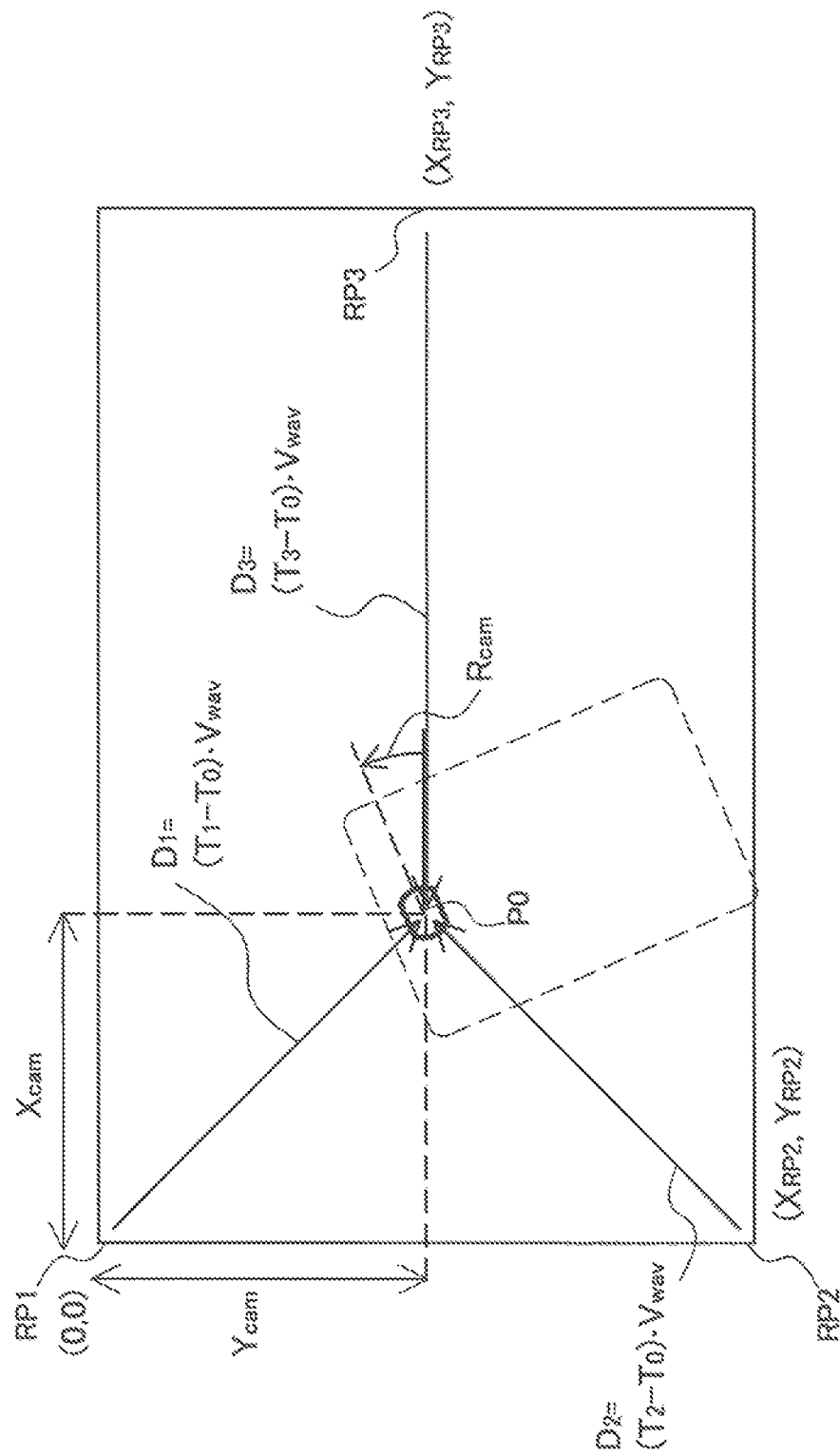
FIG. 10 is an explanatory diagram for describing the determination of a relative position and a rotation amount of a camera based on the second example of a determination pattern.

FIG. 10 is an explanatory diagram for describing the determination of a relative position and a rotation amount of the camera based on the second example of a determination pattern. As shown in FIG. 10, a relative position P0 of the camera 202 is expressed by coordinates (Xcam, Ycam). A reference point RP1 is positioned at coordinates (0, 0), a reference point RP2 is positioned at coordinates (XRP2, YRP2), and a reference point RP3 is positioned at coordinates (XRP3, YRP3). Further, a propagation velocity common to the three ripple objects is set to Vwav. In the case where synchronization between the devices is not performed, the departure times T0 of the ripple objects will be unknown for the imaging side device. Arrival times necessary for the ripple objects WA1, WA2 and WA3 up to arriving at the position P0 can be respectively expressed with (T1−T0), (T2−T0) and (T3−T0), by using measured arrival times T1, T2 and T3. Distances D1, D2 and D3 from the reference points RP1, RP2 and RP3 up to the position P0 are expressed such as in the following equations.

$$D_1=(T_1-T_0) \cdot V_{wav}$$

$$D_2=(T_2-T_0) \cdot V_{wav}$$

$$D_3=(T_3-T_0) \cdot V_{wav}$$

Here, the following three equations are established by Pythagorean Theorem.

$$X_{cam}^2+Y_{cam}^2=D_1^2=(T_1-T_0)^2 \cdot V_{wav}^2 \quad (1)$$

$$(X_{cam}-X_{RP2})^2+(Y_{cam}-Y_{RP2})^2=D_2^2=(T_2-T_0)^2 \cdot V_{wav}^2 \quad (2)$$

$$(X_{cam}-X_{RP3})^2+(Y_{cam}-Y_{RP3})^2=D_3^2=(T_3-T_0)^2 \cdot V_{wav}^2 \quad (3)$$

Since there are the three unknown numbers of the departure time $T_0$ and the coordinates $(X_{cam}, Y_{cam})$ in equations (1) to (3), by solving these equations, the coordinates $(X_{cam}, Y_{cam})$ can be calculated.

Note that, the departure times $T_0$ of the ripple objects may be notified to the imaging side device 200, by displaying some visual signal (for example, the entire image becoming momentarily brighter or the like) on the screen of the display side device 100. Further, the departure times $T_0$ of the ripple objects may be times agreed to between the devices by negotiation in the preparation phase. In the case where such a synchronization between devices is performed, the departure times $T_0$ will become known for both devices. In this case, by simply displaying two ripple objects, the coordinates $(X_{cam}, Y_{cam})$ can be calculated by using Pythagorean Theorem.

(3) Third Example

FIG. 11 is an explanatory diagram which shows a third example of a determination pattern. In the third example, the determination pattern displays moving objects which move on the screen along a predetermined track. More specifically, with reference to FIG. 11, a determination pattern PT3 displays a moving object BA1 which moves along a track TR1, a moving object BA2 which moves along a track TR2, and a moving object BA3 which moves along a track TR3. The parameter generation function 50 respectively measures the arrival times of these moving objects to the camera 202, and generates parameters which show the measured arrival times. In the third example, the above described mechanism of time synchronization may also be used. The position determination function 65 determines a relative position of the camera 202, by using the arrival times shown by the parameters generated by the parameter generation function 50. For example, in the case where the tracks TR1, TR2 and TR3 and the movement speed of the moving objects are known for the position determination function 65, a relative position of the camera 202 can be determined from the arrival times measured for these moving objects. Further, the parameter generation function 50 can generate parameters which show the movement directions of these moving objects when each of the moving objects arrives at the camera 202. The position determination function 65 can determine a relative rotation amount of the camera 202, based on the movement directions shown by the parameters generated by the parameter generation function 50. Note that, the number of moving objects displayed by the determination pattern PT3 is not limited to that of the example of FIG. 11, and may be any number of one or more. Since the time up to when a first one (or n) moving object arrives at the camera 202 will become shorter as the number of displayed moving objects increases, the time necessary for the determination of a relative position and a rotation amount can be reduced.

(4) Fourth Example

FIG. 12 is an explanatory diagram which shows a fourth example of a determination pattern. In the fourth example, the determination pattern displays at least two scanning line objects which scan the screen. More specifically, with reference to FIG. 12, a determination pattern PT4 displays a scanning line object LN1 which moves from left to right parallel to a vertical axis, and a scanning line object LN2 which moves from up to down parallel to a horizontal axis. The parameter generation function 50 respectively measures the arrival times of these scanning line objects to the camera 202, and generates parameters which show the measured arrival times. In the fourth example, the above described mechanism of time synchronization may also be used. The position determination function 65 determines a relative position of the camera 202, by using the arrival times shown by the parameters generated by the parameter generation function 50. For example, a horizontal direction coordinate value Xcam can be determined, based on the arrival time measured for the scanning line object LN1. A vertical direction coordinate value Ycam can be determined, based on the arrival time measured for the scanning line object LN2. Further, each of the scanning line objects have a gradient of shading (or an image characteristic other than this) along this moving direction. The parameter generation function 50 can generate parameters which show the directions of the gradient of shading determined from a captured image when each of the scanning line objects arrive at the camera 202. The position determination function 65 can determine a relative rotation amount of the camera 202, based on the directions of the gradient shown by the parameters generated by the parameter generation function 50. Movement directions of each of the scanning line objects determined by using a plurality of frames of captured images may be used, instead of the directions of the gradient of shading, for the determination of a rotation amount.

Note that, the determination patterns described by using FIG. 7 to FIG. 12 may be displayed on the entire screen of the display side device 100, or may be displayed only on a portion of the screen. For example, the display side device 100 may causes the determination pattern to be displayed on only a placement region (for example, a region on which a change of electrostatic capacity or a change of pressure is detected which exceeds a threshold) on the imaging side device 200 which can be recognized through the sensor 104 or the input interface 106 (with a rough recognition accuracy). In this way, other arbitrary services can be provided to a user by using the remaining screen region during the determination phase.

Further, the above described determination patterns are merely examples. The candidates of a determination pattern may include various types of other still image patterns or moving image patterns. Further, the candidates of a determination pattern may include a plurality of moving image patterns in which the size, color or movement speed of similar types of display objects are different.

[5-2. Flow of Position Determination]
(1) Case of a Still Image

FIG. 13A is a flow chart which shows an example of the flow of processes of the determination phase of the display side device 100 in the case where a still image pattern is used in the first embodiment.

As shown in FIG. 13A, the processes of the determination phase start in the case where a determination start trigger is detected by one or both of the trigger detection function 20 of the display side device 100 and the trigger detection function 25 of the imaging side device 200 (step S111).

After the determination start trigger is detected, the pattern display function 30 of the display side device 100 causes a determination pattern of a still image, such as that illustrated in FIG. 7, to be displayed on the screen of the display 102 (step S113). Afterwards, the information acquisition function 75 of the display side device 100 waits, until a prescribed time out period elapses, for the reception of determination information showing a determination result for a relative position (and rotation amount) of the camera 202 of the imaging side device 200 (step S115). During this time, the display of the determination pattern on the screen is maintained.

When the time out period elapses without determination information being received (step S121), the pattern display function 30 determines whether to retry (step S123). For example, in the case where a user input which instructs a retry is detected, in the case where the number of retries has not reached a threshold, or in the case where an untried determination pattern is present, the pattern display function 30 may determine to retry. In the case where it is determined to retry, the process returns to step S113, and the determination pattern is again displayed on the screen (step S113). The determination pattern displayed here may be a pattern the same as a determination pattern already tried, or may be a different pattern. The pattern display function 30 may transmit identification information, which identifies a determination pattern to be newly displayed, to the imaging side device 200 via the wireless communication interface 114. In the case where it is determined not to retry, the processes shown in FIG. 13A end.

When determination information is received by the information acquisition function 75 prior to the time out period elapsing, the process transitions to the UI processing phase, and a GUI based on the received determination result is displayed on the screen, by the UI control function 80 of the display side device 100 (step S127).

Figure 13B:
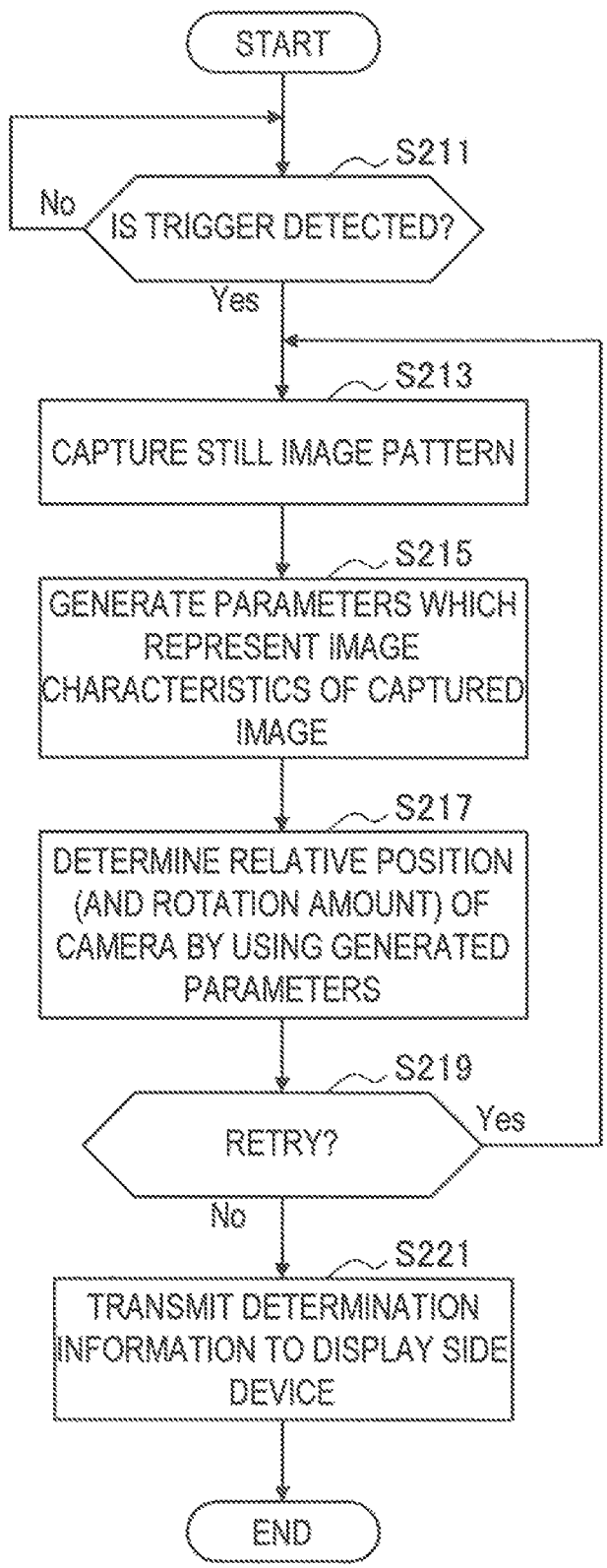
FIG. 13B is a flow chart which shows an example of the flow of processes of a determination phase of the imaging side device in the case where a still image pattern is used in the first embodiment.

FIG. 13B is a flow chart which shows an example of the flow of processes of the determination phase of the imaging side device 200 in the case where a still image pattern is used in the first embodiment.

As shown in FIG. 13B, the processes of the determination phase are started in the case where a determination start trigger is detected by one or both of the trigger detection function 20 of the display side device 100 and the trigger detection function 25 of the imaging side device 200 (step S211).

After the determination start trigger is detected, the pattern imaging function 35 of the imaging side device 200 acquires a captured image of a determination pattern, by capturing a still image pattern displayed by the display side device 100 by using the camera 202 (step S213). The parameter generation function 50 of the imaging side device 200 generates parameters which represent image characteristics of the acquired captured image of the determination pattern (step S215). The position determination function 65 of the imaging side device 200 determines a relative position (and rotation amount) of the camera 202, by using the parameters generated by the parameter generation function 50 (step S217).

Afterwards, the position determination function 65 of the imaging side device 200 determines whether to retry (step S219). For example, in the case where a usual determination result is not obtained in step S217, the position determination function 65 may determine to retry. In the case where it is determined to retry, the process returns to step S213, and the determination pattern is again captured. The parameter generation function 50 and the position determination function 65 may re-execute the generation of parameters and the determination of a relative position, by using a new determination pattern identified by identification information received from the display side device 100 via the wireless communication interface 214.

In the case where a usual determination result is obtained in step S217, the information transmission function 70 of the imaging side device 200 transmits determination information, which shows the relative position (and rotation amount) determined by the position determination function 65 as a determination result, to the display side device 100 via the wireless communication interface 214 (step S221).

Figure 14A:
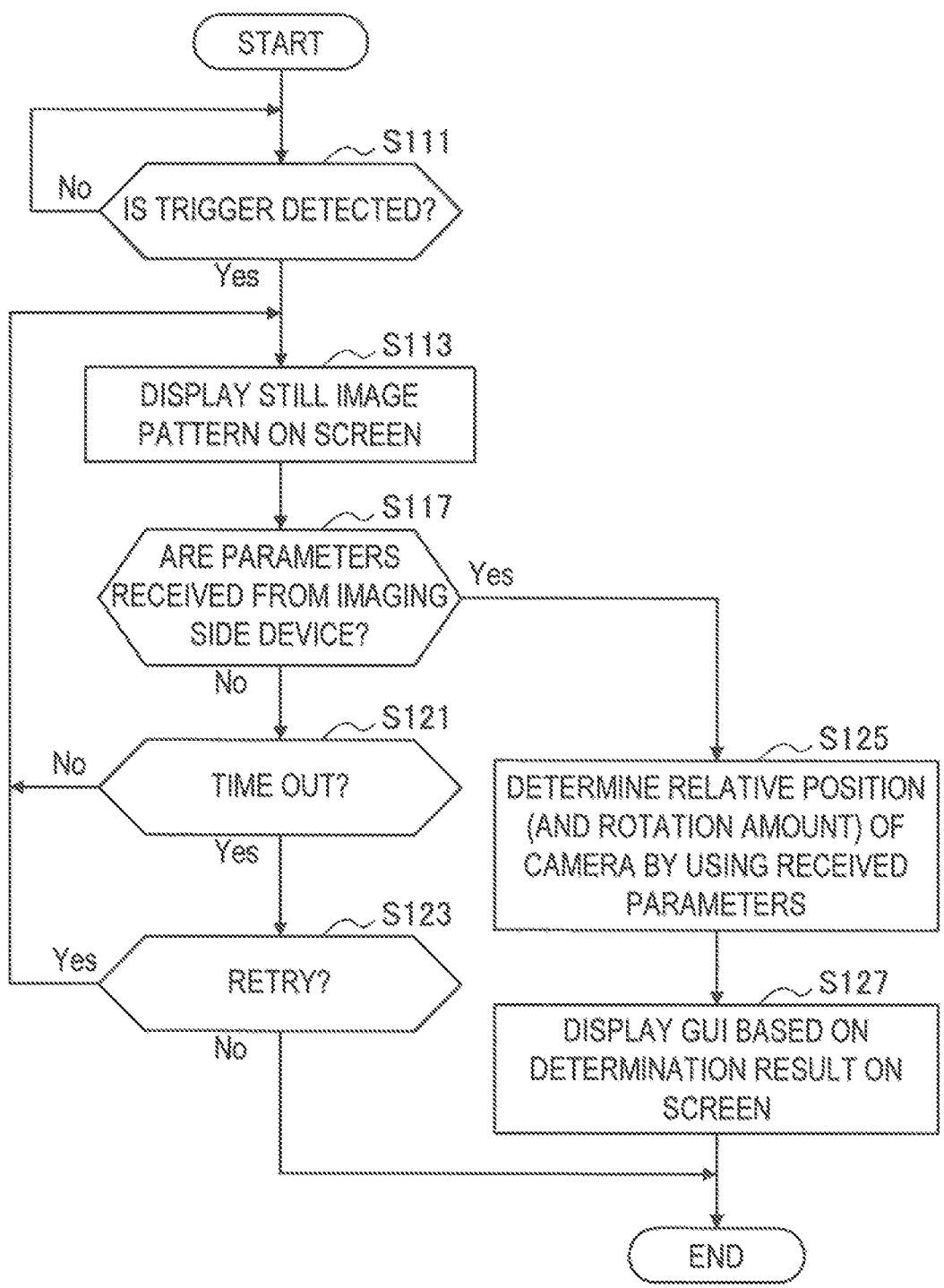
FIG. 14A is a flow chart which shows an example of the flow of processes of a determination phase of the display side device in the case where a still image pattern is used in the second embodiment.

FIG. 14A is a flow chart which shows an example of the flow of the processes of the determination phase of the display side device 100 in the case where a still image pattern is used in the second embodiment.

After the determination start trigger is detected, the pattern display function 30 of the display side device 100 causes a determination pattern of a still image, such as that illustrated in FIG. 7, to be displayed on the screen of the display 102 (step S113). Afterwards, the parameter acquisition function 60 of the display side device 100 waits, until a prescribed time out period elapses, for the reception of parameters generated by the imaging side device 200 based on a captured image of the determination pattern (step S117). During this time, the display of the determination pattern on the screen is maintained.

When the time out period elapses without parameters being received (step S121), the pattern display function 30 determines whether to retry (step S123). In the case where it is determined to retry, the process returns to step S113, and the determination pattern is again displayed on the screen (step S113). In the case where it is determined not to retry, the processes shown in FIG. 14A end.

When parameters are received by the parameter acquisition function 60 prior to the time out period elapsing, the position determination function 65 of the display side device 100 determines a relative position (and rotation amount) of the camera 202 of the imaging side device 200, by using the received parameters (step S125). Afterwards, the process transitions to the UI processing phase, and a GUI based on a determination result is displayed on the screen, by the UI control function 80 of the display side device 100 (step S127).

Figure 14B:
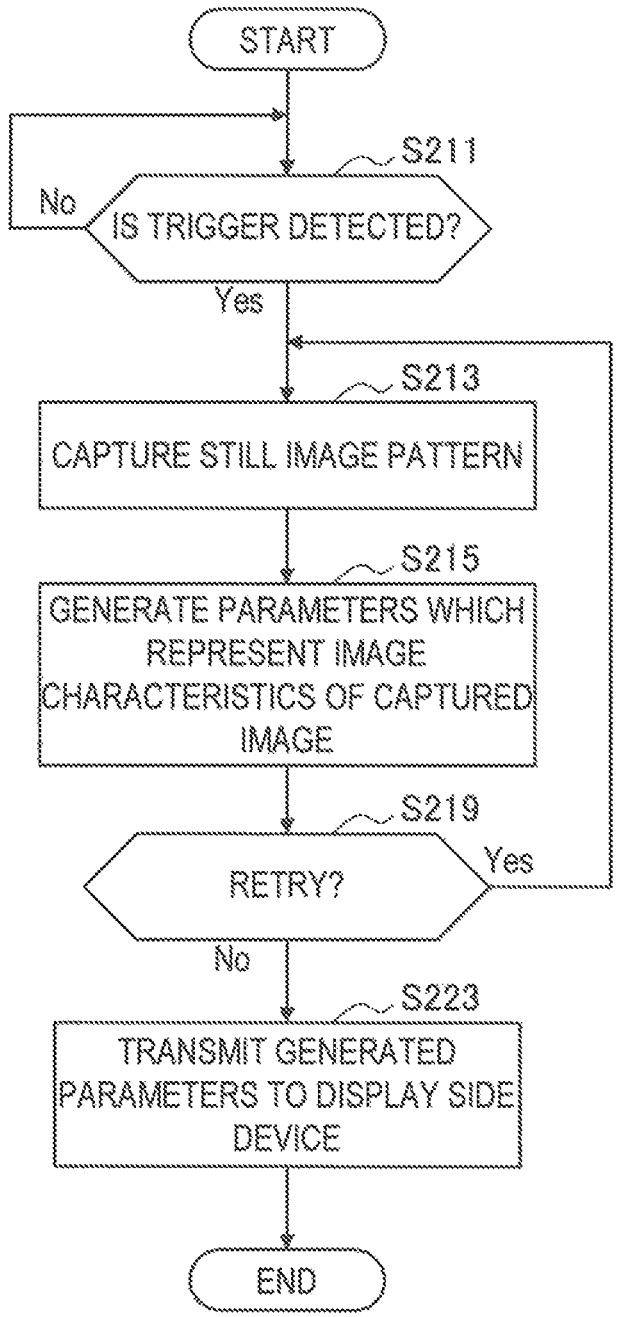
FIG. 14B is a flow chart which shows an example of the flow of processes of a determination phase of the imaging side device in the case where a still image pattern is used in the second embodiment.

FIG. 14B is a flow chart which shows an example of the flow of processes of the determination phase of the imaging side device 200 in the case where a still image pattern is used in the second embodiment.

After the determination start trigger is detected, the pattern imaging function 35 of the imaging side device 200 acquires a captured image of a determination pattern, by capturing a still image pattern displayed by the display side device 100 by using the camera 202 (step S213). The parameter generation function 50 of the imaging side device 200 generates parameters which represent image characteristics of the acquired captured image of the determination pattern (step S215).

Afterwards, the parameter generation function 50 of the imaging side device 200 determines whether to retry (step S219). For example, in the case where parameters are not able to be usually generated in step S215, the parameter generation function 50 may determine to retry. In the case where it is determined to retry, the process returns to step S213, and the determination pattern is again captured.

In the case where parameters are usually generated in step S215, the parameter transmission function 55 of the imaging side device 200 transmits the parameters generated by the parameter generation function 50 to the display side device 100 via the wireless communication interface 214 (step S223).

(2) Case of a Moving Image

Figure 15A:
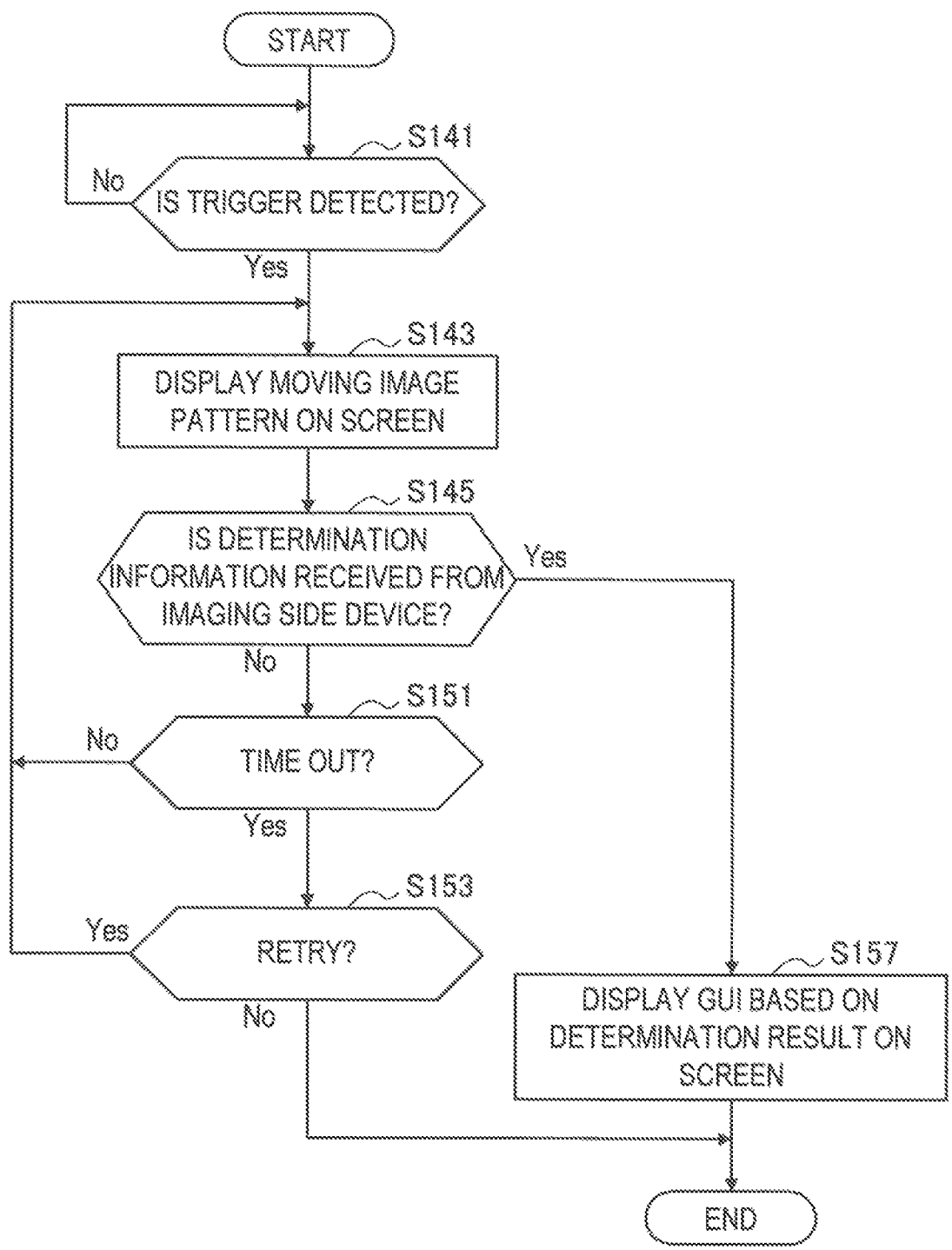
FIG. 15A is a flow chart which shows an example of the flow of processes of a determination phase of the display side device in the case where a moving image pattern is used in the first embodiment.

FIG. 15A is a flow chart which shows an example of the flow of the processes of the determination phase of the display side device 100 in the case where a moving image pattern is used in the first embodiment.

As shown in FIG. 15A, the processes of the determination phase start in the case where a determination start trigger is detected by one or both of the trigger detection function 20 of the display side device 100 and the trigger detection function 25 of the imaging side device 200 (step S141).

After the determination start trigger is detected, the pattern display function 30 of the display side device 100 causes a determination pattern of a moving image, such as that illustrated in FIG. 9, 11, or 12, to be displayed on the screen of the display 102 (step S143). Afterwards, the information acquisition function 75 of the display side device 100 waits, until a prescribed time out period elapses, for the reception of determination information showing a determination result for a relative position (and rotation amount) of the camera 202 of the imaging side device 200 (step S145). During this time, the display of the determination pattern on the screen is maintained.

When the time out period elapses without determination information being received (step S151), the pattern display function 30 determines whether to retry (step S153). For example, in the case where a user input which instructs a retry is detected, in the case where the number of retries has not reached a threshold, in the case where the imaging side device 200 has requested a retry, or in the case where an untried determination pattern is present, the pattern display function 30 may determine to retry. In the case where it is determined to retry, the process returns to step S143, and the determination pattern is again displayed on the screen (step S143). The determination pattern displayed here may be a pattern the same as a determination pattern already tried, or may be a different pattern. The pattern display function 30 may transmit identification information, which identifies a determination pattern to be newly displayed, to the imaging side device 200 via the wireless communication interface 114. In the case where it is determined not to retry, the processes shown in FIG. 15A end.

When determination information is received by the information acquisition function 75 prior to the time out period elapsing, the process transitions to the UI processing phase, and a GUI based on the received determination result is displayed on the screen, by the UI control function 80 of the display side device 100 (step S157).

Figure 15B:
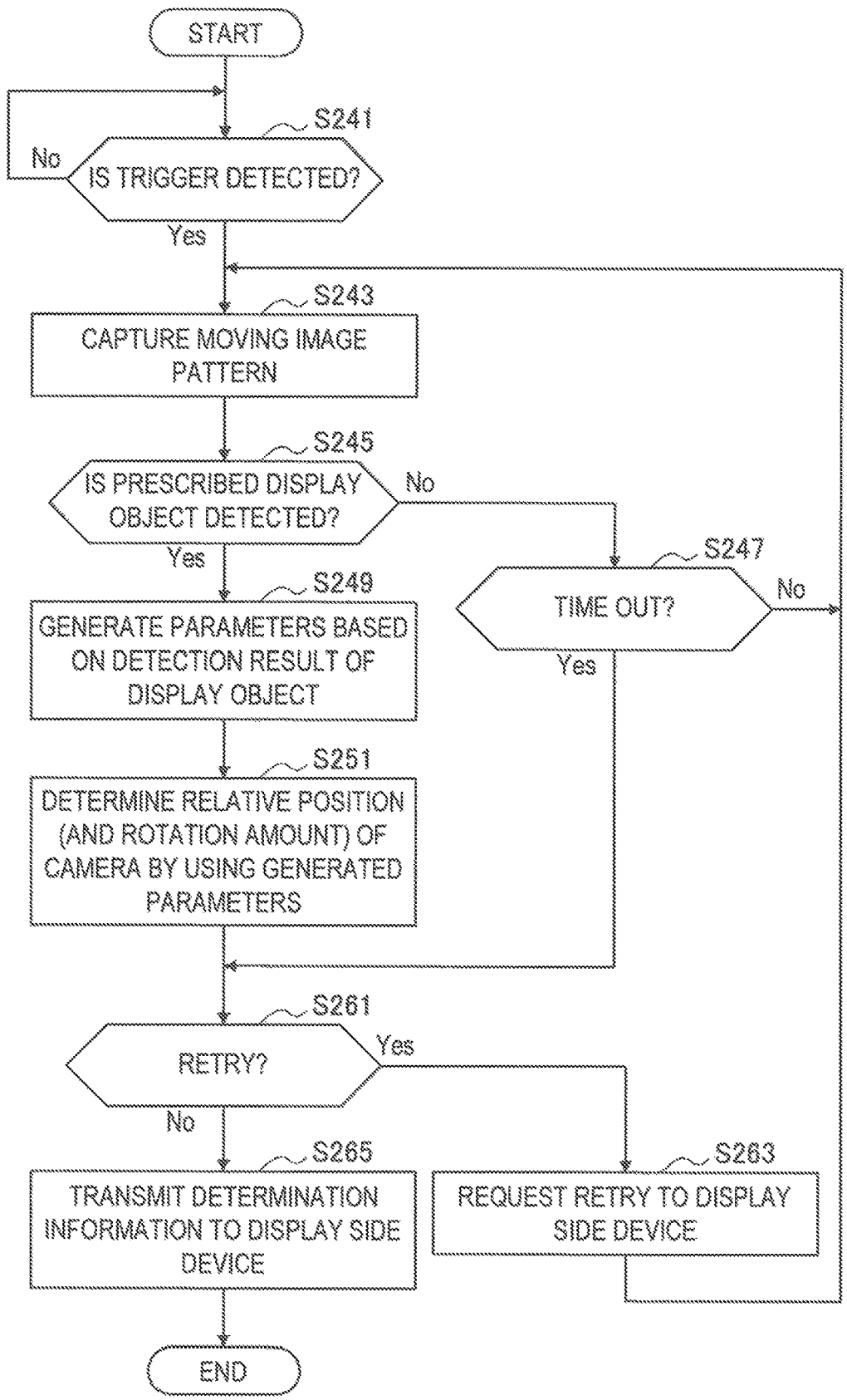
FIG. 15B is a flow chart which shows an example of the flow of processes of a determination phase of the imaging side device in the case where a moving image pattern is used in the first embodiment.

FIG. 15B is a flow chart which shows an example of the flow of processes of the determination phase of the imaging side device 200 in the case where a moving image pattern is used in the first embodiment.

As shown in FIG. 15B, the processes of the determination phase are started in the case where a determination start trigger is detected by one or both of the trigger detection function 20 of the display side device 100 and the trigger detection function 25 of the imaging side device 200 (step S241).

After the determination start trigger is detected, the pattern imaging function 35 of the imaging side device 200 acquires a captured image of a determination pattern, by capturing a moving image pattern displayed by the display side device 100 by using the camera 202 (step S243). Until a prescribed display object is detected (step S245), or until a prescribed time out period elapses (step S247), imaging by the camera 202 is repeatedly performed. The prescribed display object here may be, for example, the three ripple objects described by using FIG. 9, one from among the moving objects described by using FIG. 11, the two scanning line objects described by using FIG. 12 or the like. When a prescribed display object is detected, the parameter generation function 50 of the imaging side device 200 generates parameters, based on a detection result of the display object (step S249). The position determination function 65 of the imaging side device 200 determines a relative position (and rotation amount) of the camera 202, by using the parameters generated by the parameter generation function 50 (step S251).

Afterwards, the position determination function 65 of the imaging side device 200 determines whether to retry (step S253). For example, in the case where a usual determination result is not obtained in step S251, or in the case where a user input which instructs a retry is detected, the position determination function 65 may determines to retry. The determination of a retry is also performed in the case where the time out period elapses without a prescribed display object being detected. In the case where it is determined to retry, the position determination function 65 of the imaging side device 200 requests a retry to the display side device (step S263). The process returns to step S243, and the determination pattern is again captured. The parameter generation function 50 and the position determination function 65 may re-execute the generation of parameters and the determination of a relative position, by using a new determination pattern identified by identification information received from the display side device 100 via the wireless communication interface 214.

In the case where a usual determination result is obtained in step S251, the information transmission function 70 of the imaging side device 200 transmits determination information, which shows the relative position (and rotation amount) determined by the position determination function 65 as a determination result, to the display side device 100 via the wireless communication interface 214 (step S265).

Figure 16A:
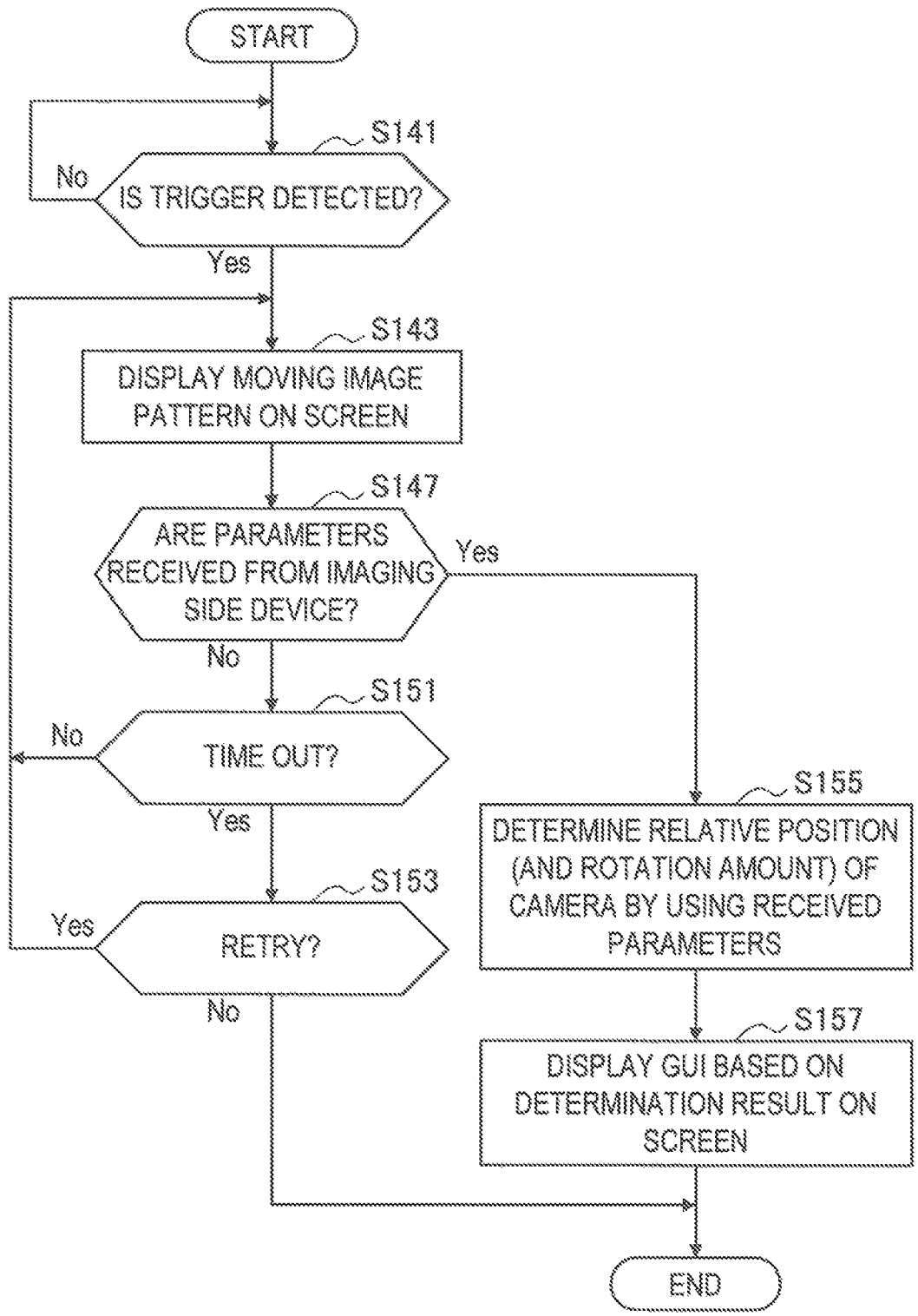
FIG. 16A is a flow chart which shows an example of the flow of processes of a determination phase of the display side device in the case where a moving image pattern is used in the second embodiment.

FIG. 16A is a flow chart which shows an example of the flow of the processes of the determination phase of the display side device 100 in the case where a moving image pattern is used in the second embodiment.

After the determination start trigger is detected, the pattern display function 30 of the display side device 100 causes a determination pattern of a moving image, such as that illustrated in FIG. 9, 11, or 12, to be displayed on the screen of the display 102 (step S143). Afterwards, the parameter acquisition function 60 of the display side device 100 waits, until a prescribed time out period elapses, for the reception of parameters generated by the imaging side device 200 based on a captured image of the determination pattern (step S147). During this time, the display of the determination pattern on the screen is maintained.

When the time out period elapses without parameters being received (step S151), the pattern display function 30 determines whether to retry (step S153). In the case where it is determined to retry, the process returns to step S143, and the determination pattern is again displayed on the screen (step S143). In the case where it is determined not to retry, the processes shown in FIG. 16A end.

When parameters are received by the parameter acquisition function 60 prior to the time out period elapsing, the position determination function 65 of the display side device 100 determines a relative position (and rotation amount) of the camera 202 of the imaging side device 200, by using the received parameters (step S155). Afterwards, the process transitions to the UI processing phase, and a GUI based on a determination result is displayed on the screen, by the UI control function 80 of the display side device 100 (step S157).

Figure 16B:
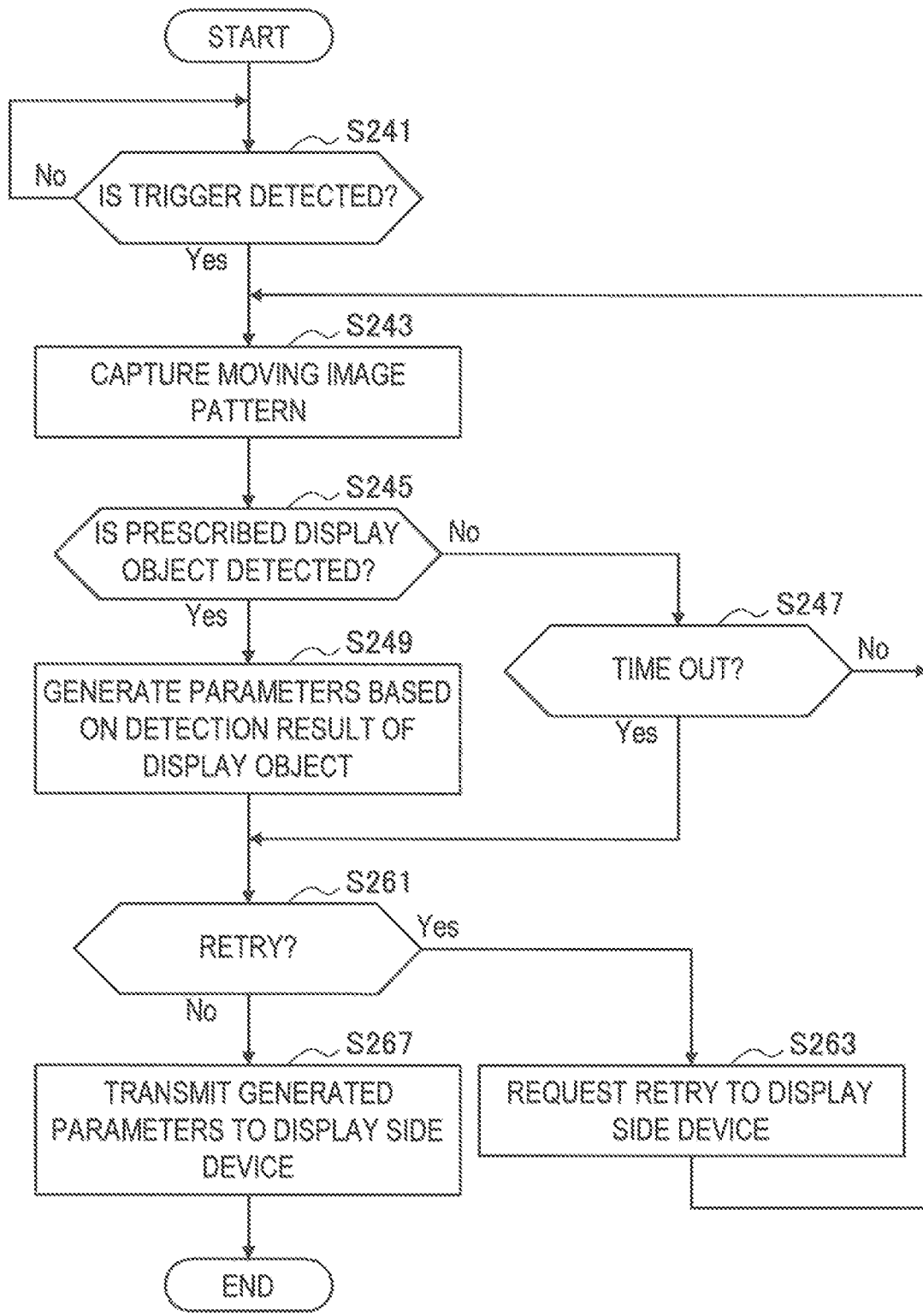
FIG. 16B is a flow chart which shows an example of the flow of processes of a determination phase of the imaging side device in the case where a moving image pattern is used in the second embodiment.

FIG. 16B is a flow chart which shows an example of the flow of processes of the determination phase of the imaging side device 200 in the case where a moving image pattern is used in the second embodiment.

After the determination start trigger is detected, the pattern imaging function 35 of the imaging side device 200 acquires a captured image of a determination pattern, by capturing a moving image pattern displayed by the display side device 100 by using the camera 202 (step S243). Until a prescribed display object is detected (step S245), or until a prescribed time out period elapses (step S247), imaging by the camera 202 is repeatedly performed. When a prescribed display object is detected, the parameter generation function 50 of the imaging side device 200 generates parameters, based on a detection result of the display object (step S249).

Afterwards, the parameter generation function 50 of the imaging side device 200 determines whether to retry (step S261). For example, in the case where parameters are not able to be usually generated in step S249, or in the case where a user input which instructs a retry is detected, the parameter generation function 50 may determine to retry. The determination of a retry is also performed in the case where the time out period elapses without a prescribed display object being detected. In the case where it is determined to retry, the parameter generation function 50 of the imaging side device 200 requests a retry to the display side device (step S263). Then, the process returns to step S243, and the determination pattern is again captured.

In the case where parameters are usually generated in step S249, the parameter transmission function 55 of the imaging side device 200 transmits the parameters generated by the parameter generation function 50 to the display side device 100 via the wireless communication interface 214 (step S267).

6. DETAILS OF THE UI PROCESSING PHASE

In this section, the details of the user interface provided to a user in the above described UI processing phase will be described. The user interface described here is roughly classified into two types of UI. The first type of UI is a GUI for data coordination between devices, which is displayed based on the position (and rotation amount) of the camera 202 of the imaging side device 200. The second type of UI is a UI which uses the position of the camera 202 as a pointing position.

6-1. Data Coordination (1) First Example

Figure 17:
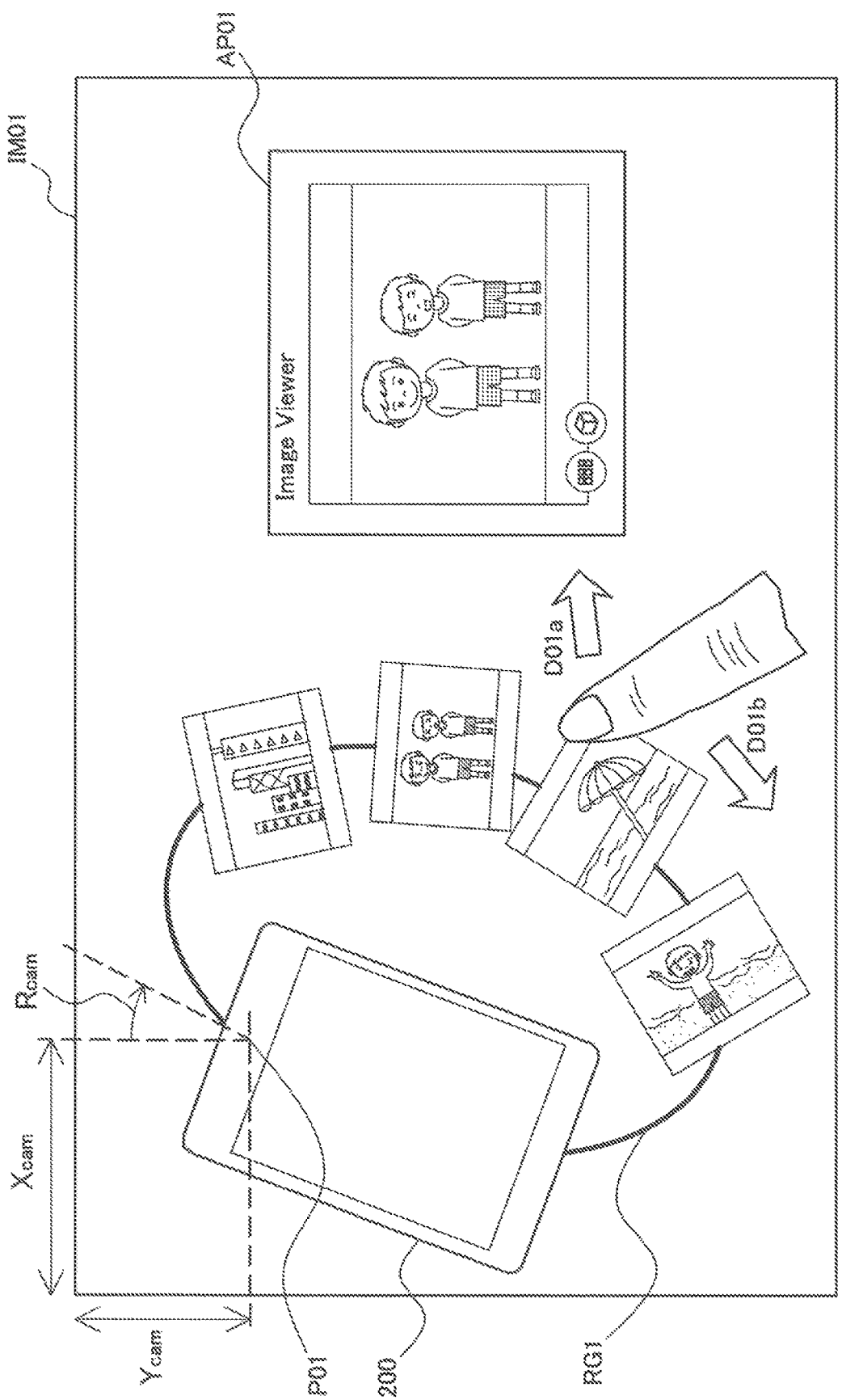
FIG. 17 is an explanatory diagram which shows a first example of a UI for data coordination between devices.

FIG. 17 is an explanatory diagram which shows a first example of a UI for data coordination between devices. With reference to FIG. 17, a UI image IM01 which can be displayed on the screen of the display side device 100 in the UI processing phase, and the imaging side device 200 placed on the screen, are shown. The camera 202 of the imaging side device 200 is positioned at a point P01 on the screen having coordinates (Xcam, Ycam), and is inclined by a rotation amount Rcam from a vertical axis. The UI control function 80 of the display side device 100 causes a UI object RG1 associated with the imaging side device 200 to be displayed on the screen, by outputting display control signals to the display 102. The UI object RG1 is an oval type display object having a long axis inclining by the rotation amount Rcam, through the point P01. The display position of the UI object RG1 can be determined based on the coordinates (Xcam, Ycam) of the point P01 and the rotation amount Rcam. Thumbnails of image content held by the imaging side device 200 (for example, stored by the memory 208) are sequentially arranged on an oval track of the UI object RG1.

On the other hand, an application window AP01 is displayed on an empty region of the screen of the display side device 100. The application window AP01 is a window for an image viewer. For example, the UI control function 80 detects a user input (the arrow D01a within the figure), which drags a thumbnail on the UI object RG1 to the application window AP01, via the input interface 106. Then, the data coordination function 95 of the imaging side device 200 transmits content data of image content specified by a user, in accordance with a request from the data coordination function 90 of the display side device 100, via a wireless link. The data coordination function 90 of the display side device 100 transfers this content data received from the imaging side device 200 to the image viewer. As a result of this, the specified image content is reproduced in the application window AP01. Further, when a user input (the arrow D01b within the figure) which shows dragging along the oval track of the UI object RG1 is detected, the UI control function 80 causes the series of thumbnails of image content to be scrolled along the oval track. Through such an operation, a user can inspect selected image content with a larger screen of the display side device 100, by selecting desired content from the image content held by the imaging side device 200.

(2) Second Example

Figure 18:
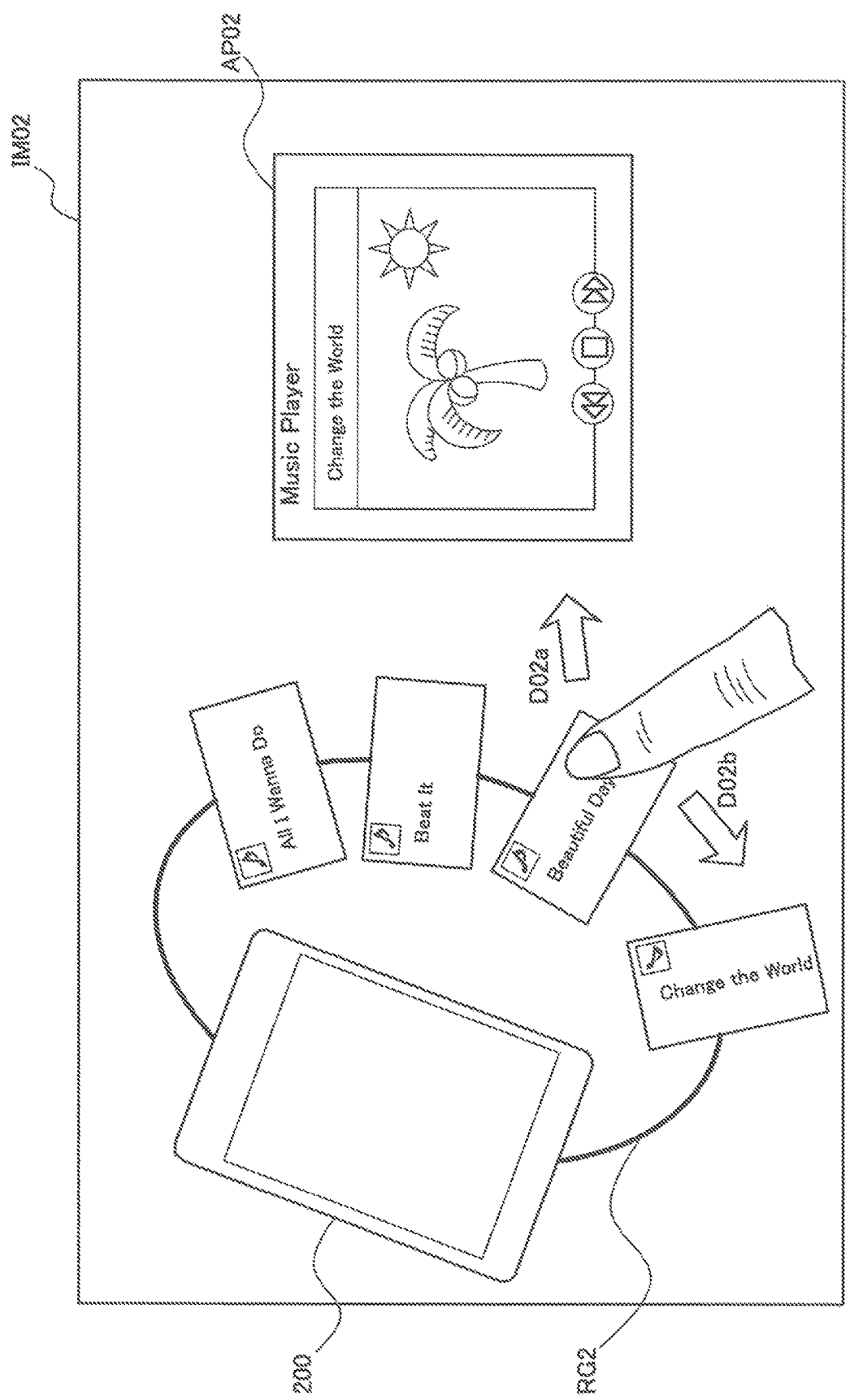
FIG. 18 is an explanatory diagram which shows a first example of a UI for data coordination between devices.

FIG. 18 is an explanatory diagram which shows a second example of a UI for data coordination between devices. With reference to FIG. 18, a UI image IM02 which can be displayed on the screen of the display side device 100 in the UI processing phase, and the imaging side device 200 placed on the screen, are shown. The UI control function 80 of the display side device 100 causes a UI object RG2 associated with the imaging side device 200 to be displayed on the screen, by outputting display control signals to the display 102. The UI object RG2 is an oval type display object having an arrangement determined based on a relative position and a rotation amount of the camera 202 of the imaging side device 200. Icons respectively having title labels of audio content held by the imaging side device 200 (for example, stored by the memory 208) are sequentially arranged on an oval track of the UI object RG2.

On the other hand, an application window AP02 is displayed on an empty region of the screen of the display side device 100. The application window AP02 is a window for an audio player. For example, the UI control function 80 detects a user input (the arrow D02a within the figure), which drags an icon on the UI object RG2 to the application window AP02, via the input interface 106. Then, the data coordination function 95 of the imaging side device 200 transmits content data of audio content specified by a user, in accordance with a request from the data coordination function 90 of the display side device 100, via a wireless link. The data coordination function 90 of the display side device 100 transfers this content data received from the imaging side device 200 to the audio player. As a result of this, the specified audio content is reproduced. Further, when a user input (the arrow D02b within the figure) which shows dragging along the oval track of the UI object RG2 is detected, the UI control function 80 causes the series of icons of audio content to be scrolled along the oval track. Through such an operation, a user can enjoy selected audio content through the speaker 112 of the display side device 100, by selecting desired content from the audio content held by the imaging side device 200.

(3) Third Example

Figure 19:
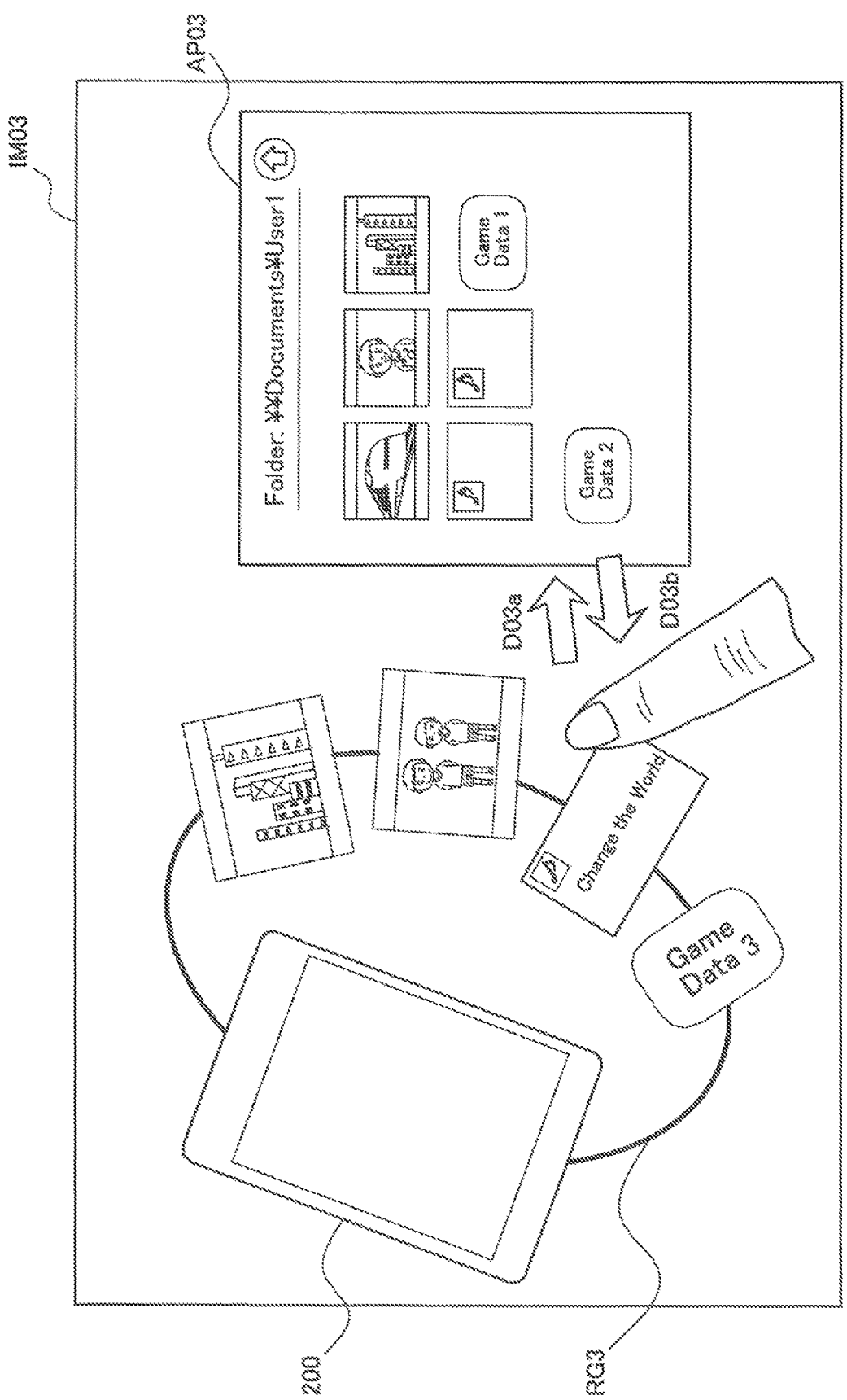
FIG. 19 is an explanatory diagram which shows a second example of a UI for data coordination between devices.

FIG. 19 is an explanatory diagram which shows a third example of a UI for data coordination between devices. With reference to FIG. 19, a UI image IM03 which can be displayed on the screen of the display side device 100 in the UI processing phase, and the imaging side device 200 placed on the screen, are shown. The UI control function 80 of the display side device 100 causes a UI object RG3 associated with the imaging side device 200 to be displayed on the screen, by outputting display control signals to the display 102. The UI object RG3 is an oval type display object having an arrangement determined based on a relative position and a rotation amount of the camera 202 of the imaging side device 200. Icons of various types of content (for example, image content, audio content and saved data of games) held by the imaging side device 200 are sequentially arranged on an oval track of the UI object RG3.

On the other hand, an application window AP03 is displayed on an empty region of the screen of the display side device 100. The application window AP03 is a window for a file manager. For example, the UI control function 80 detects a user input (the arrow D03a within the figure), which drags an icon on the UI object RG3 to the application window AP03, via the input interface 106. Then, the data coordination function 95 of the imaging side device 200 transmits a data file of content corresponding to an icon specified by a user, in accordance with a request from the data coordination function 90 of the display side device 100, via a wireless link. The data coordination function 90 of the display side device 100 transfers this data file received from the imaging side device 200 to the file manager. As a result of this, the specified data file is stored in a folder of the display side device 100 selected in the application window AP03. Conversely, when a user input (the arrow D03b within the figure) which shows dragging from the application window AP03 to the UI object RG3 is detected by the UI control function 80, the data file held by the display side device 100 can be transmitted to the imaging side device 200.

(4) Fourth Example

Figure 20:
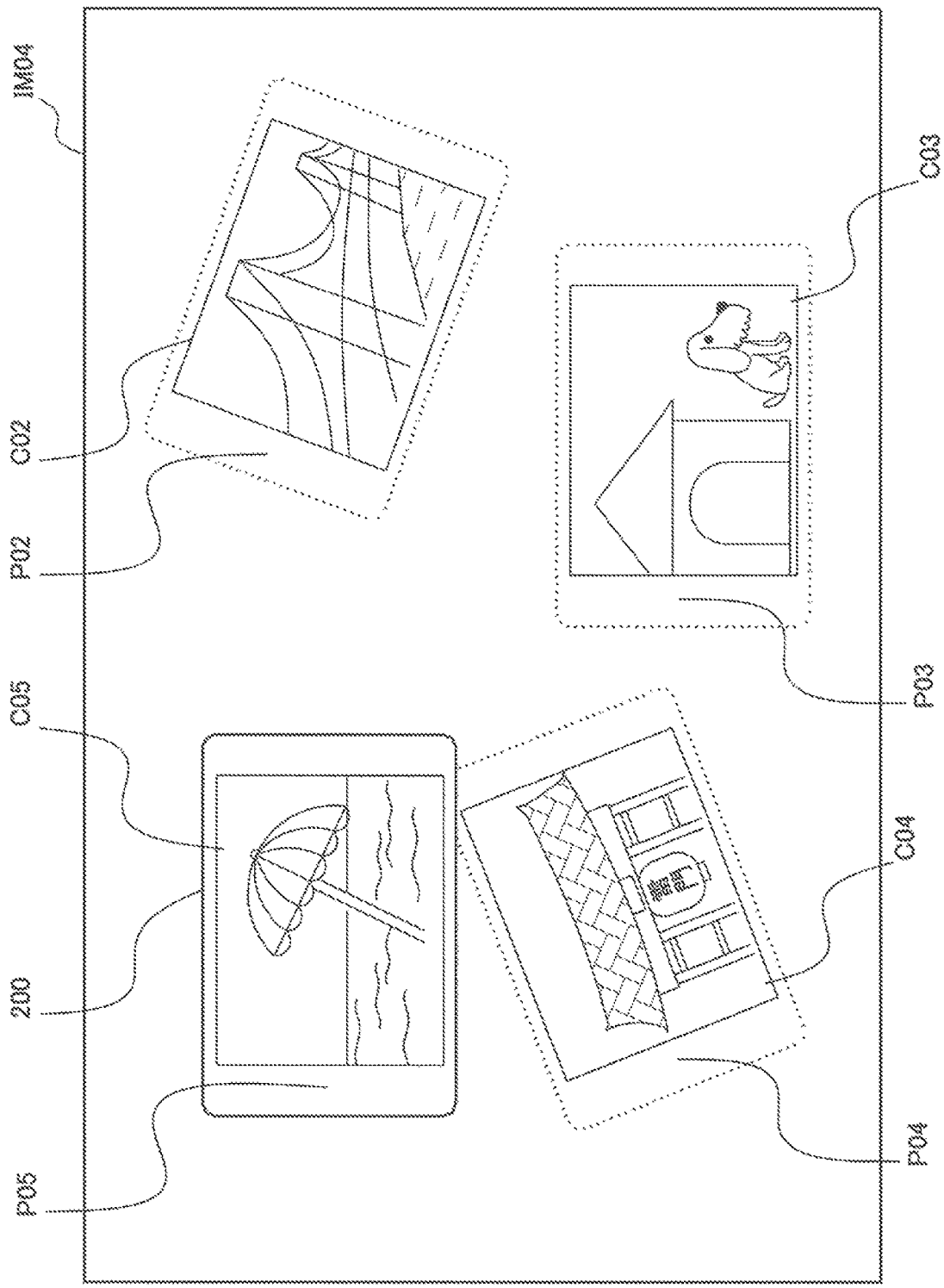
FIG. 20 is an explanatory diagram which shows a third example of a UI for data coordination between devices.

FIG. 20 is an explanatory diagram which shows a fourth example of a UI for data coordination between devices. With reference to FIG. 20, a UI image IM04 which can be displayed on the screen of the display side device 100 in the UI processing phase, and the imaging side device 200 placed on the screen, are shown. The imaging side device 200 is placed on the screen of the display side device 100, so that the camera 202 is positioned at a point P05 on the screen. It will be assumed that the imaging side device 200 has been placed at a different location in the past, and the camera 202 is respectively placed at a point P02 in a first time, at a point P03 in a second time, and at a point P04 in a third time.

In the first time, the data coordination function 95 of the imaging side device 200 transmits content data of image content C02, in accordance with some user input, via a wireless link. When this content data is received from the imaging side device 200 by the data coordination function 90 of the display side device 100, the UI control function 80 causes a display object which reproduces the image content C02 to be displayed on the screen, by outputting display control signals to the display 102. This display object occupies a region corresponding to a relative arrangement of the imaging side device 200 with respect to the screen of the display side device 100. This region occupied by the display object can be determined by using the relative position and rotation amount of the camera 202 determined in the determination phase, and the above described profile data defined in advance for the imaging side device 200. Similarly, in the second time, the third time and the fourth time, display objects which respectively reproduce image content C03, C04 and C05 can be sequentially posted to the screen of the display side device 100.

(5) Fifth Example

Figure 21:
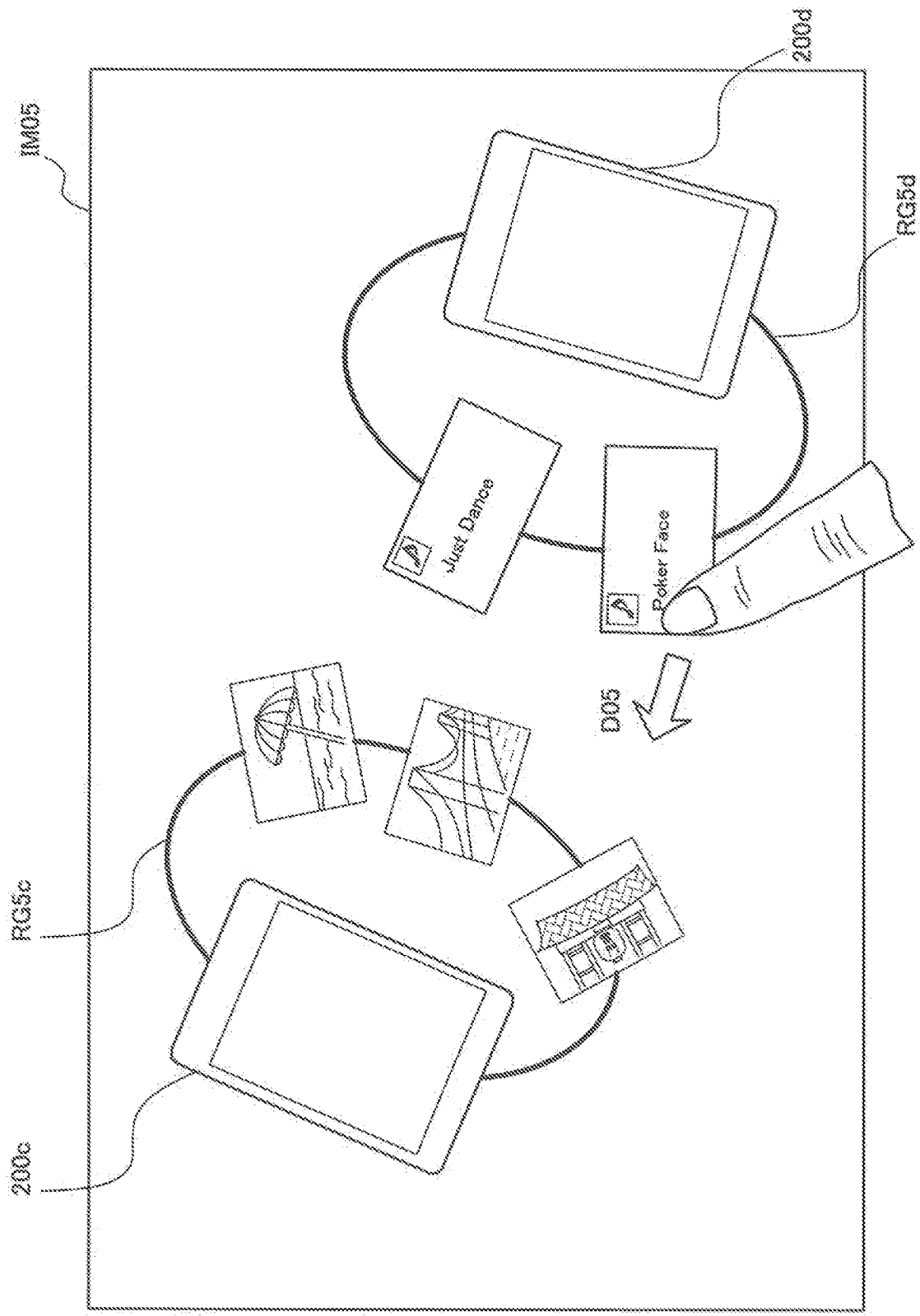
FIG. 21 is an explanatory diagram which shows a fourth example of a UI for data coordination between devices.

In FIG. 17 to FIG. 19, UIs for data coordination between the display side device 100 and the imaging side device 200 are shown. It is also possible for the same UI to be applied for data coordination between two or more imaging side devices 200. FIG. 21 is an explanatory diagram which shows a fifth example of a UI for data coordination between devices. With reference to FIG. 21, a UI image IM05 which can be displayed on the screen of the display side device 100 in the UI processing phase, and two imaging side devices 200*c* and 200*d* placed on the screen, are shown. The UI control function 80 of the display side device 100 causes a UI object RG5*c* associated with the imaging side device 200*c* and a UI object RG5*d* associated with the imaging side device 200*d* to be displayed on the screen. The UI objects RG5*c* and RG5*d* are oval shaped display objects which respectively have arrangements determined based on a relative position and a rotation amount of the camera determined in the determination phase. Icons of content held by the imaging side device 200*c* are sequentially arranged on an oval track of the UI object RG5*c*. Icons of content held by the imaging side device 200*d* are sequentially arranged on an oval track of the UI object RG5*d*.

When a user input (the arrow D05 within the figure) which shows dragging from the UI object RG5*d* to the UI object RG5*c* is detected, the UI control function 80 of the display side device 100 causes content data of content specified by a user held by the imaging side device 200*d* to be transmitted to the imaging side device 200*c*, via a wireless link. Similarly, when a user input which shows dragging from the UI object RG5*c* to the UI object RG5*d* is detected, the UI control function 80 causes content data of content specified by a user held by the imaging side device 200*c* to be transmitted to the imaging side device 200*d* via a wireless link.

(6) Sixth Example

Figure 22:
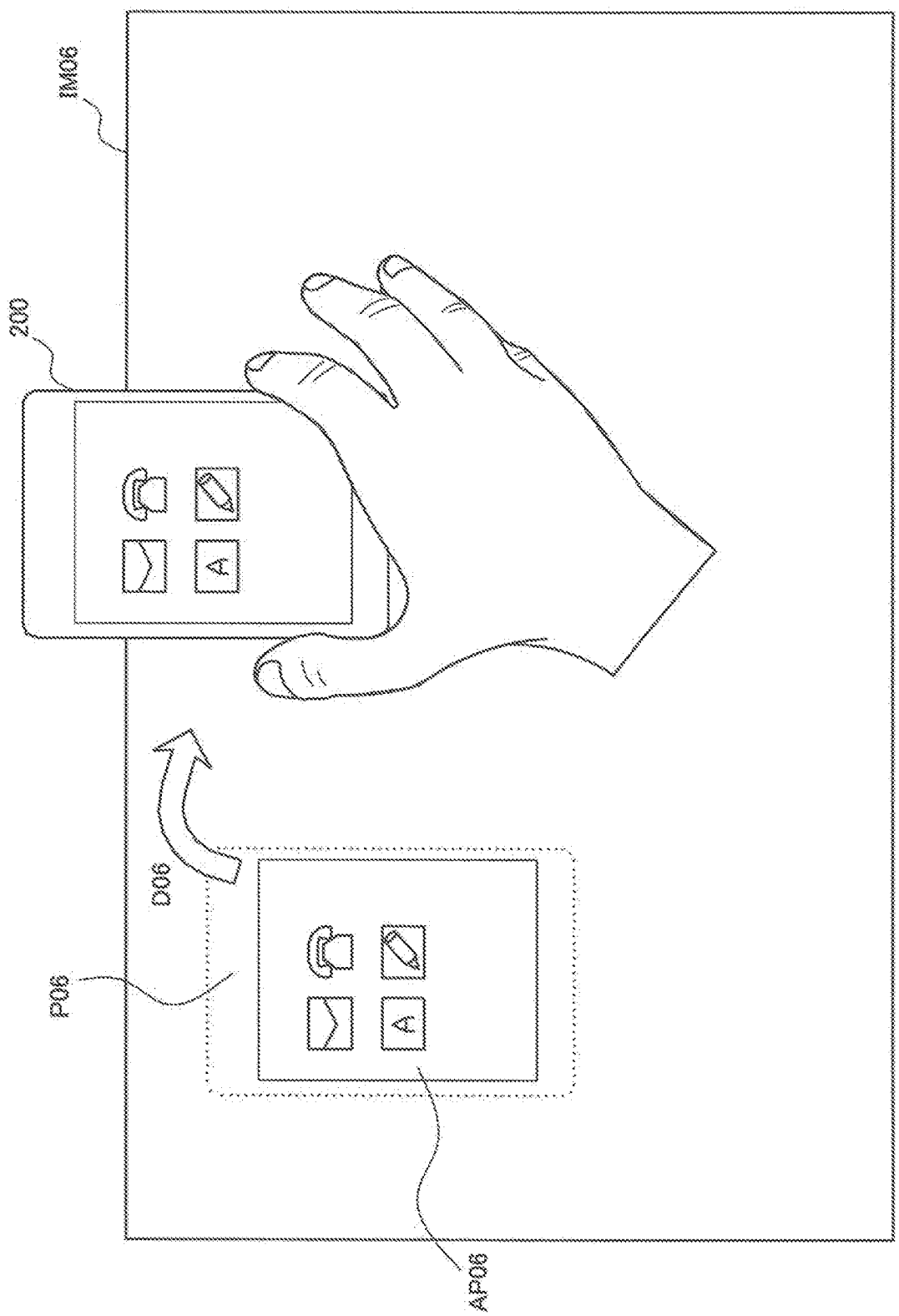
FIG. 22 is an explanatory diagram which shows a fifth example of a UI for data coordination between devices.

FIG. 22 is an explanatory diagram which shows a sixth example of a UI for data coordination between devices. With reference to FIG. 22, a UI image IM06 which can be displayed on the screen of the display side device 100 in the UI processing phase, and the imaging side device 200 separated from the screen by a user, are shown. While the imaging side device 200 is placed on the screen of the display side device 100, it is determined that the camera 202 is placed at a point P06, by the process of the determination phase. The UI control function 80 of the display side device 100 causes a UI object AP06 associated with the imaging side device 200 to be displayed on the screen, by outputting display control signals to the display 102. The UI object AP06 is a window for a remote desktop application in which the imaging side device 200 is capable of being remotely operated by a user. The UI object AP06 occupies a region corresponding to a relative arrangement of the imaging side device 200 with respect to the screen of the display side device 100 (at the time when the determination phase is executed). This region occupied by the UI object AP06 can be determined by using the relative position and rotation amount of the camera 202 determined in the determination phase, and the above described profile data defined in advance for the imaging side device 200. Such a window for a remote desktop may be generated for a plurality of imaging side devices 200.

6-2. Pointing UI (1) First Example

Figure 23:
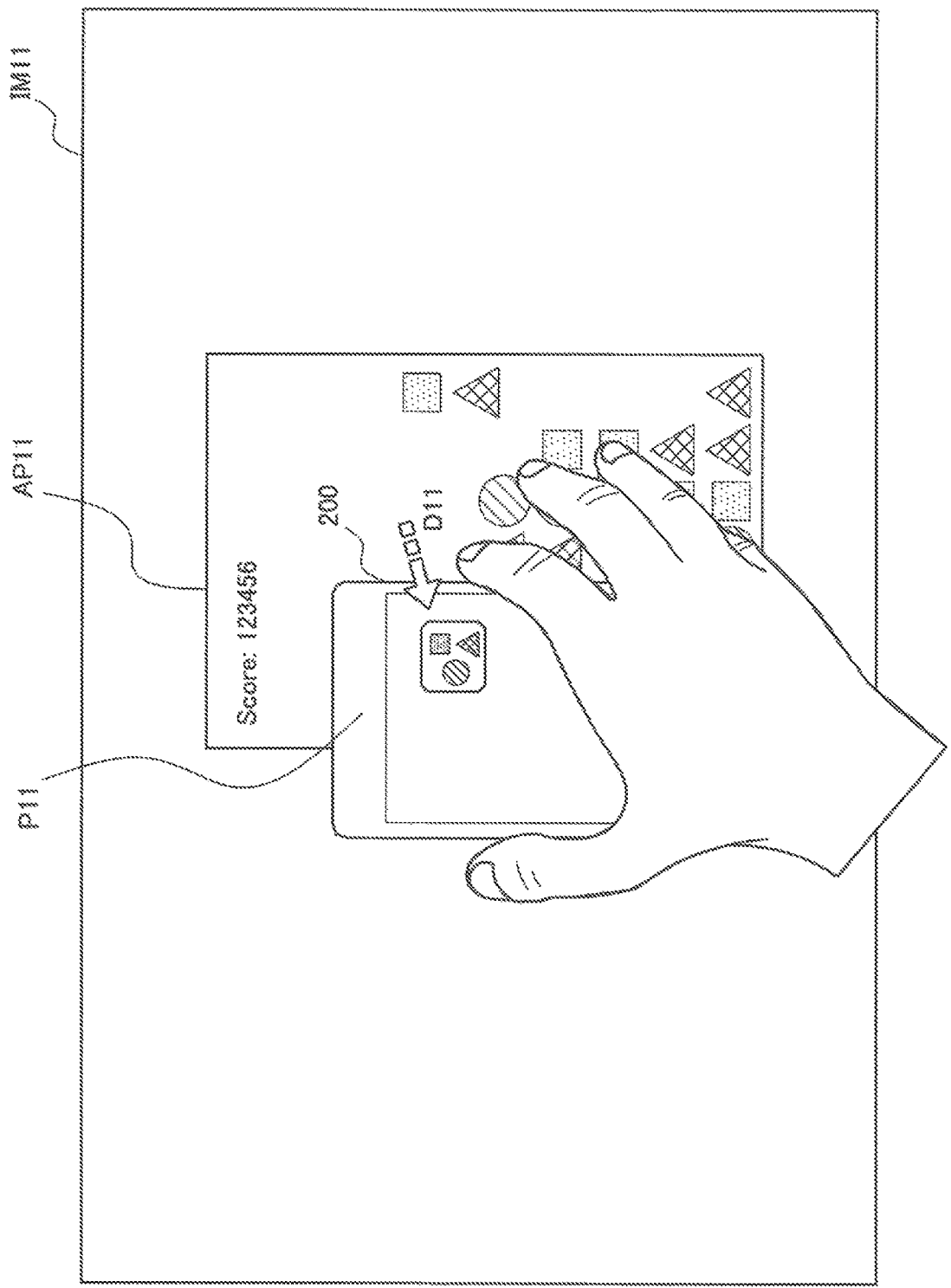
FIG. 23 is an explanatory diagram which shows a first example of a pointing UI.

FIG. 23 is an explanatory diagram which shows a first example of a pointing UI. With reference to FIG. 23, a UI image IM11 which includes an application window AP11 is displayed on the screen of the display side device 100. The application window AP11 is a window for a puzzle game. For example, a user provides a user input corresponding to a determination start trigger to the device, in a state where the imaging side device 200 is arranged so that the camera 202 is positioned at a point P11. Then, a relative position of the camera 202 with respect to the screen of the display side device 100 is acquired by the display side device 100, in accordance with the above described mechanism. The data coordination function 90 of the display side device 100 recognizes that the acquired relative position (that is, the point P11) is pointing to the application window AP11, and transmits application data of a corresponding puzzle game to the imaging side device 200 (the arrow D11 within the figure). The data coordination function 95 of the imaging side device 200 installs the puzzle game pointed at by a user to the imaging side device 200, by using the application data received from the display side device 100. Such an application installed through a pointing UI is not limited to a game application, and may be various types of arbitrary applications.

(2) Second Example

Figure 24:
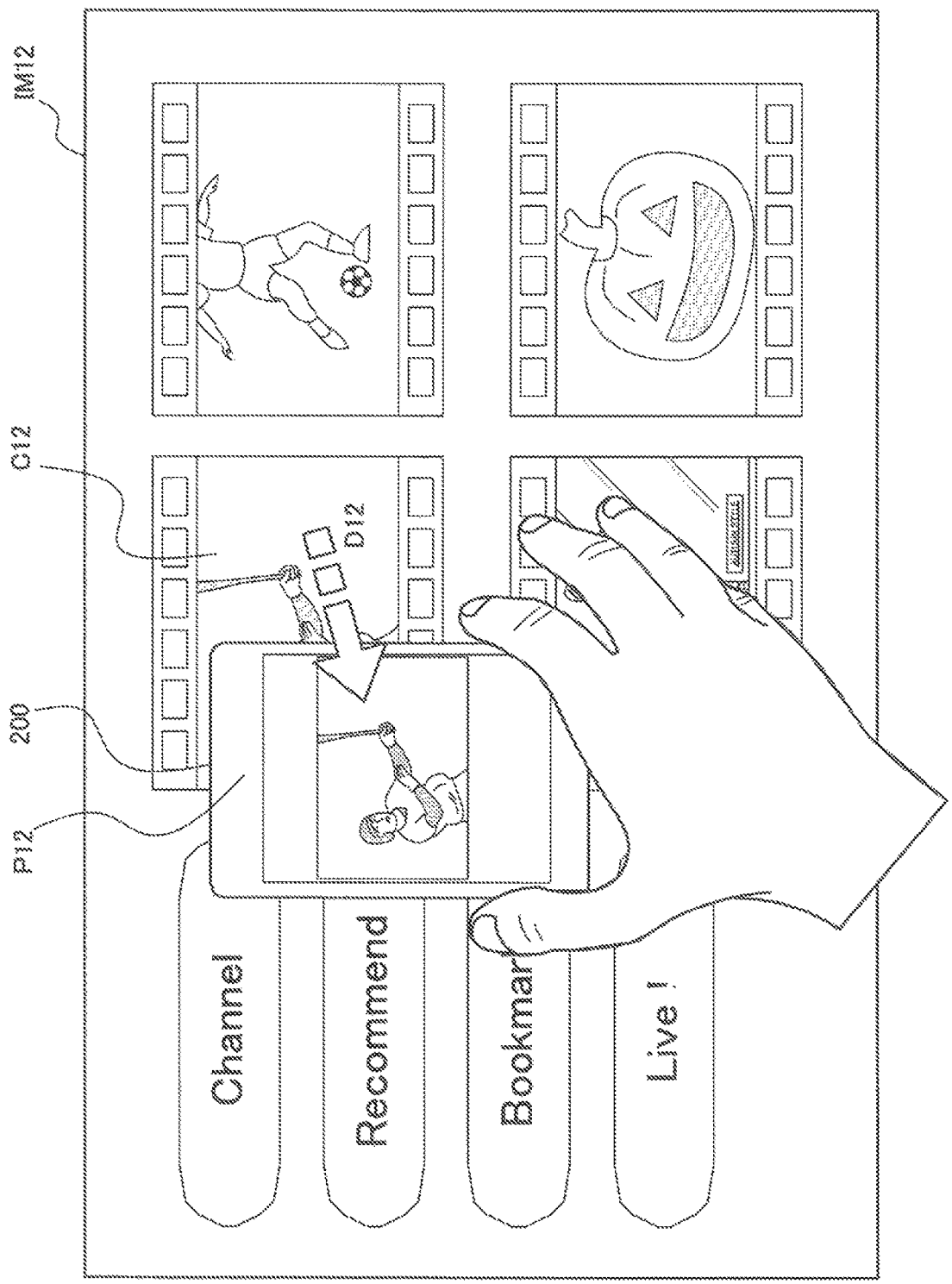
FIG. 24 is an explanatory diagram which shows a first example of a pointing UI.

FIG. 24 is an explanatory diagram which shows a second example of a pointing UI. With reference to FIG. 24, a UI image IM12 is displayed on the screen of the display side device 100. The UI image IM12 is a window for a player of moving image content. For example, a user provides a user input corresponding to a determination start trigger to the device, in a state where the imaging side device 200 is arranged so that the camera 202 is positioned at a point P12. Then, a relative position of the camera 202 with respect to the screen of the display side device 100 is acquired by the display side device 100, in accordance with the above described mechanism. The data coordination function 90 of the display side device 100 recognizes that the acquired relative position (that is, the point P12) is pointing to moving image content C12, and transmits content data of the moving image content C12 to the imaging side device 200 (the arrow D12 within the figure). The data coordination function 95 of the imaging side device 200 receives this content data from the display side device 100, and reproduces or stores the moving image content C12. Such content transmitted and received through a pointing UI is not limited to moving image content, and may be various types of arbitrary content.

(3) Example 3

Figure 25:
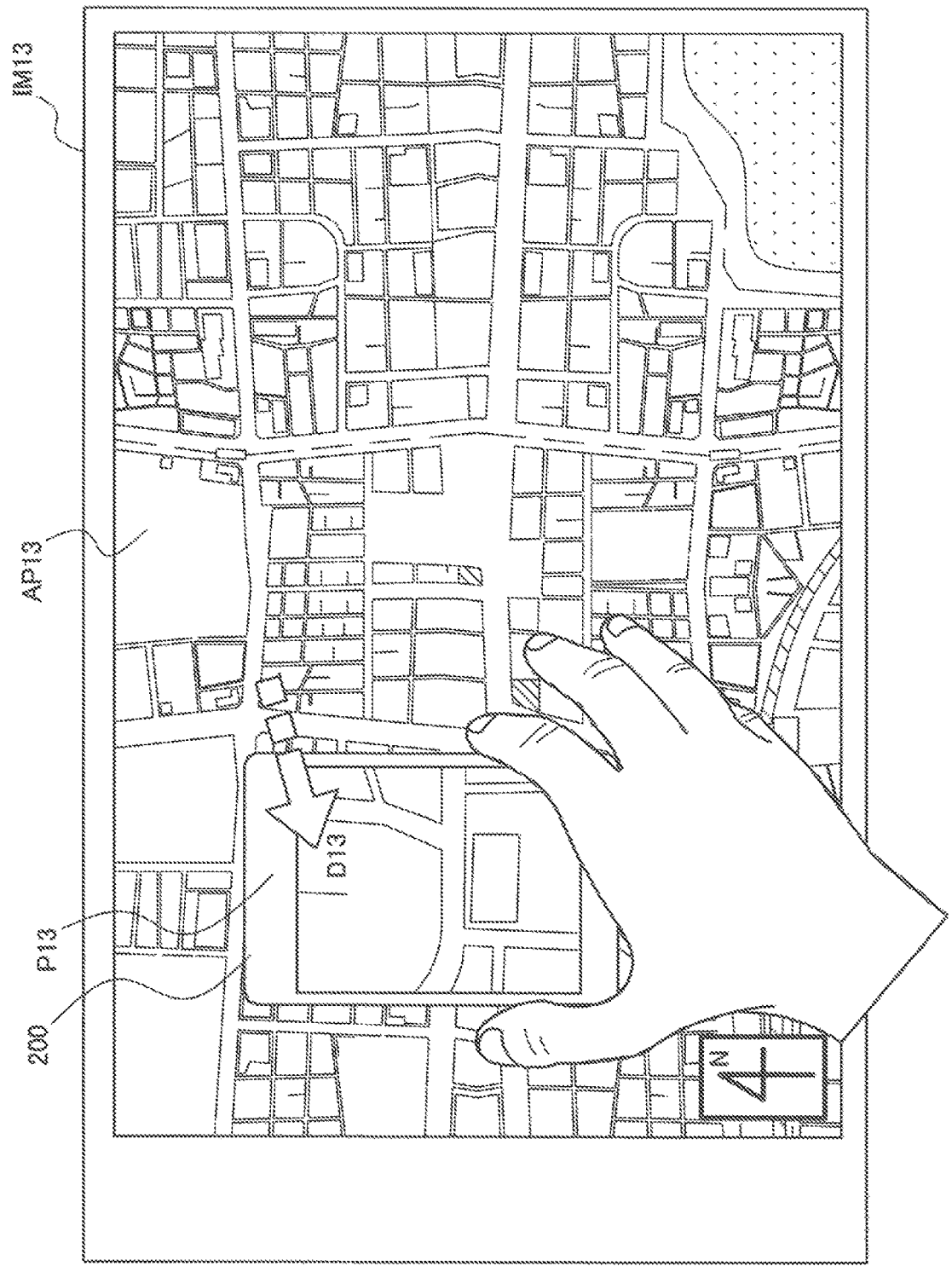
FIG. 25 is an explanatory diagram which shows a first example of a pointing UI.

FIG. 25 is an explanatory diagram which shows a third example of a pointing UI. With reference to FIG. 25, a UI image IM13 which includes an application window AP13 is displayed on the screen of the display side device 100. The application window AP13 is a window for a navigation application which displays a map. For example, a user provides a user input corresponding to a determination start trigger to the device, in a state where the imaging side device 200 is arranged so that the camera 202 is positioned at a point P13. Then, a relative position of the camera 202 with respect to the screen of the display side device 100 is acquired by the display side device 100, in accordance with the above described mechanism. The data coordination function 90 of the display side device 100 transmits more detailed map data of a point on the map corresponding to the acquired relative position (that is, the point P13) to the imaging side device 200 (the arrow D13 within the figure). The data coordination function 95 of the imaging side device 200 receives this map data from the display side device 100, and causes a detailed map to be displayed on the screen of the imaging side device 200.

(4) Fourth Example

Figure 26:
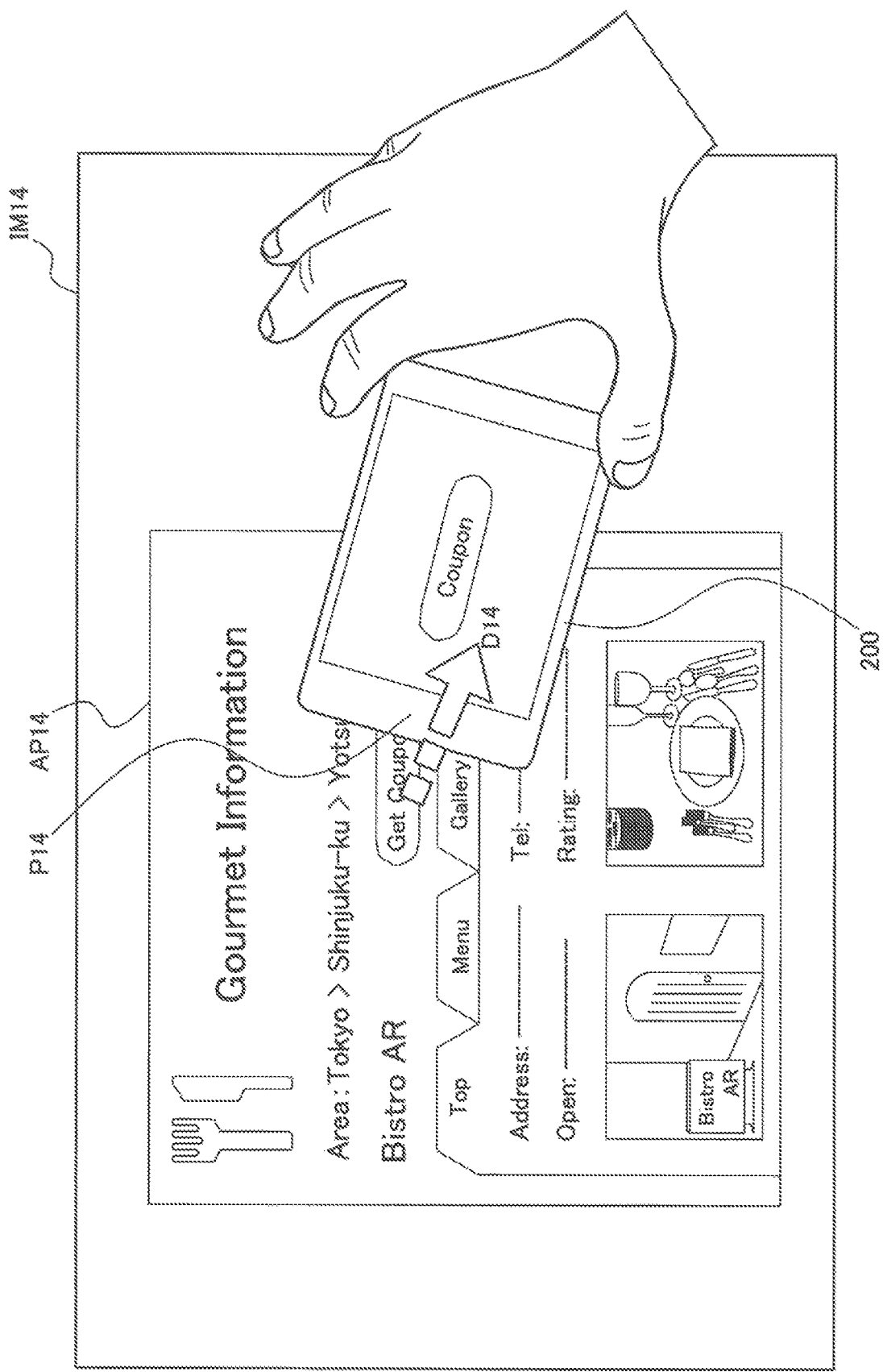
FIG. 26 is an explanatory diagram which shows a first example of a pointing UI.

FIG. 26 is an explanatory diagram which shows a fourth example of a pointing UI. With reference to FIG. 26, a UI image 1M14 which includes an application window AP14 is displayed on the screen of the display side device 100. The application window AP14 is a window for a browser which displays a Web page in which restaurant information is described. For example, a user provides a user input corresponding to a determination start trigger to the device, in a state where the imaging side device 200 is arranged so that the camera 202 is positioned at a point P14. Then, a relative position of the camera 202 with respect to the screen of the display side device 100 is acquired by the display side device 100, in accordance with the above described mechanism. The data coordination function 90 of the display side device 100 transmits link data (for example, a URL) which shows a link destination associated with the acquired relative position (that is, the point P14) to the imaging side device 200 (the arrow D14 within the figure). The data coordination function 95 of the imaging side device 200 receives this link data from the display side device 100, and causes Web content acquired from the Web server of the link destination by the link data to be displayed on the screen of the imaging side device 200. The Web content acquired here may be a usual Web page, for example, or may be specific data such as an online coupon.

(5) Fifth Example

FIG. 27 is an explanatory diagram which shows a fifth example of a pointing UI. With reference to FIG. 27, a UI image 1M14 which includes an application window AP15 is displayed on the screen of the display side device 100. The application window AP15 is a window for a document viewer which displays a document in which a quiz problem is described. For example, a user provides a user input corresponding to a determination start trigger to the device, in a state where the imaging side device 200 is arranged so that the camera 202 is positioned at a point P15. Then, a relative position of the camera 202 with respect to the screen of the display side device 100 is acquired by the display side device 100, in accordance with the above described mechanism. The data coordination function 90 of the display side device 100 transmits identification data which identifies a quiz problem displayed at the acquired relative position (that is, the point P15) to the imaging side device 200 (the arrow D15 within the figure). The data coordination function 95 of the imaging side device 200 causes an answer of the quiz problem identified by this identification data received from the display side device 100 to be displayed on the screen of the imaging side device 200. Such information displayed by the imaging side device 200 through a pointing UI is not limited to an answer of a quiz problem, and may be arbitrary detailed information or related information corresponding to the information displayed by the display side device 100.

7. CONCLUSION

Up until here, various embodiments of the technology according to the present disclosure have been described by using FIG. 1 through to FIG. 27. According to the above described embodiments, a prescribed determination pattern is displayed on the screen of the display side device, in a state where the imaging side device having a camera is arranged so that the camera faces the screen of the display side device, and a relative position of the camera of the imaging side device is determined based on an image of the determination pattern captured by the camera of the imaging side device. Therefore, it becomes possible for a position specified by a user to be a specification of a more detailed position, when compared to a technique so as to specify a position based on an image from another camera which captures these devices from an overhead point of view. For example, an arbitrary position on the screen of the display side device can be specified with a high resolution. It is possible for the above described embodiments to be implemented by using a typical screen and camera of electronic devices, and additional parts such as a projection for an input to a touch panel may not be necessary.

Further, according to the above described embodiments, display control signals generated for controlling a user interface based on a relative position of the camera acquired by using a captured image of a determination pattern are output to the display of the display side device or the imaging side device. Therefore, by using the technology according to the present disclosure as a basis, various types of user interfaces utilizing features specific to the display side device and the imaging side device (that is, a screen with a comparatively large size, portability or the like) can be provided to a user.

Further, according to the above described embodiments, a GUI related to the imaging side device is displayed at a display position on the screen of the display side device determined based on a relative position of the camera of the imaging side device. Then, a user can operate content held by the imaging side device, via this GUI on the screen of the display side device, instead of on the screen of the imaging side device on which operating is complex due to the small size. Further, the shape and the size of a display object corresponding to this GUI can be determined by using profile data of the imaging side device. In this case, it becomes possible for a user to intuitively understand the association between the imaging side device and the GUI of an operation target, and the usability can be further improved. A rotation amount of the imaging side device is additionally acquired by using a captured image of the determination pattern, and in the case where a GUI additionally based on the acquired rotation amount is displayed, the association between the imaging side device and the GUI of an operation target will be additionally strengthened. For example, it becomes possible for a (display object such as a) trace or shadow of the imaging side device to remain on the screen of the display side device after the imaging side device has been separated from the screen of the display side device.

Further, according to the above described embodiments, a pointing UI can also be further provided so as to specify content to be a target of data coordination between devices, based on a relative position of the camera acquired by using a captured image of the determination pattern. In this case, a user can simultaneously specify, with one operation, a device involved with data coordination (for example, the imaging side device) and target content (arbitrary content held by the display side device).

Note that, the series of control processes by each of the apparatuses described in the present disclosure may be implemented by using either software, hardware, or a combination of software and hardware. For example, programs which constitute software are stored in advance in a storage medium (non-transitory media) included within or externally from each of the apparatuses. Also, for example, each of the programs are read to a Random Access Memory (RAM) at the time of execution, and are executed by a processor such as a CPU.

Further, the processes described by using the flow charts in the present disclosure may not necessarily be executed in the order shown in flow charts. A number of processing steps may be executed in parallel. Further, additional processing steps may be adopted, or part of the processing steps may be omitted.

Further, part of the logical functions of each of the apparatuses may be implemented in an apparatus present within a cloud computing environment (for example, a cloud server), instead of being implemented in these apparatuses.

It should be understood by those skilled in the art that various modifications, combinations, sub-combinations and alterations may occur depending on design requirements and other factors insofar as they are within the scope of the appended claims or the equivalents thereof.

Further, the effect described in the present disclosure is not limited to that specified or illustrated. That is, the technology according to the present disclosure may accomplish other effects obvious to a person skilled in the art from the description of the present disclosure, along with the above described effect or instead of the above described effect.

Additionally, the present technology may also be configured as below.

(1) An information processing apparatus, including:
a display control section which causes a prescribed pattern to be displayed on a screen in a state where a device having a camera is arranged so that the camera faces the screen; and
a position acquisition section which acquires a relative position of the camera with respect to the screen determined based on an image of the pattern captured by the camera.

(2) The information processing apparatus according to (1),
wherein the display control section generates display control signals based on the relative position of the camera acquired by the position acquisition section.

(3) The information processing apparatus according to (2),
wherein the display control section generates the display control signals for controlling a display of the screen.

(4) The information processing apparatus according to (3),
wherein the display control section generates the display control signals so that a graphical UI related to the device is displayed at a display position on the screen determined based on the relative position of the camera acquired by the position acquisition section.

(5) The information processing apparatus according to (2), further including:
a communication section which transmits, to the device, the display control signals generated by the display control section for controlling a display of a screen of the device.

(6) The information processing apparatus according to any one of (1) to (5),
wherein the display control section causes content selected based on the relative position of the camera acquired by the position acquisition section to be generated or stored in the device.

(7) The information processing apparatus according to any one of (2) to (4),
wherein the position acquisition section additionally acquires a rotation amount of the camera with respect to the screen determined based on an image of the pattern captured by the camera, and wherein the display control section generates the display control signals additionally based on the rotation amount of the camera.

(8) The information processing apparatus according to (7),
wherein the display control section generates the display control signals for causing display objects corresponding to a relative arrangement of the device with respect to the screen to be displayed by using the relative position, the rotation amount, and profile data defining an arrangement of the camera in the device.

(9) The information processing apparatus according to any one of (1) to (8),
wherein the prescribed pattern is a still image having image characteristics which change depending on a position.

(10) The information processing apparatus according to any one of (1) to (8),
wherein the prescribed pattern is a moving image which displays one or more display objects moving in accordance with time on the screen.

(11) The information processing apparatus according to (10),
wherein the relative position of the camera is determined by using an arrival time of the one or more display objects to the camera.

(12) The information processing apparatus according to (11),
wherein the one or more display objects includes
ripple objects respectively originating from at least two reference positions,
moving objects which move on the screen along a predefined track, or
at least two scanning line objects which scan the screen.

(13) The information processing apparatus according to any one of (1) to (12),
wherein the display control section causes the prescribed pattern to be displayed on the screen in accordance with a user input to the information processing apparatus or a user input to the device.

(14) The information processing apparatus according to any one of (1) to (12),
wherein the display control section causes the prescribed pattern to be displayed on the screen in accordance with a sensor input showing that the device is in contact with the screen.

(15) The information processing apparatus according to any one of (1) to (14),
wherein the position acquisition section acquires, from the device, position data showing the relative position of the camera determined based on an image of the pattern by the device.

(16) The information processing apparatus according to any one of (1) to (14),
wherein the position acquisition section acquires, from the device, parameters generated based on an image of the pattern by the device, and determines the relative position of the camera by using the acquired parameters.

(17) The information processing apparatus according to any one of (1) to (14),
wherein the position acquisition section acquires an image of the pattern captured by the device, and determines the relative position of the camera based on the acquired image of the pattern.

(18) A program for causing a processor which controls an information processing apparatus to function as:
causing a prescribed pattern to be displayed on a screen in a state where a device having a camera is arranged so that the camera faces the screen; and
acquiring a relative position of the camera with respect to the screen determined based on an image of the pattern captured by the camera.

(19) An information processing method, in an information processing system which includes a first device having a screen and a second device having a camera, the method including:
causing a prescribed pattern to be displayed on the screen of the first device in a state where the second device is arranged so that the camera faces the screen; and
acquiring a relative position of the camera with respect to the screen determined based on an image of the pattern captured by the camera.

(20) An information processing system including:
a first device having a screen; and
a second device having a camera,
wherein the first device includes a display control section which causes a prescribed pattern to be displayed on the screen in a state where the second device is arranged so that the camera faces the screen, and
wherein the first device or the second device includes a position acquisition section which acquires a relative position of the camera with respect to the screen determined based on an image of the pattern captured by the camera.

(21) An information processing apparatus, including:
an image acquisition section which acquires a captured image in which a prescribed pattern displayed on a screen of a device having a screen is captured by a camera in a state where the camera is arranged so that the camera faces the screen; and
a control section which generates parameters used for determining a relative position of the camera with respect to the screen based on the captured image acquired by the image acquisition section.

(22) A program for causing a processor which controls an information processing apparatus to function as:
acquiring a captured image in which a prescribed pattern displayed on a screen of a device having a screen is captured by a camera in a state where the camera is arranged so that the camera faces the screen; and
generating parameters used for determining a relative position of the camera with respect to the screen based on the acquired captured image.

What is claimed is:

1. An information processing apparatus, comprising:
a screen; and
circuitry configured to:
control a display of a specific pattern on the screen;
acquire a relative position of a camera of a first external apparatus with respect to the screen of the information processing apparatus, wherein
the camera of the first external apparatus faces the screen,
the relative position of the camera of the first external apparatus with respect to the screen is determined based on an image of the displayed specific pattern captured by the camera of the first external apparatus, and
the relative position is a position of the camera of the first external apparatus relative to the screen of the information processing apparatus;
control a display of at least one first display object on the screen based on the relative position of the first external apparatus with respect to the screen; and
control data coordination between the information processing apparatus and the first external apparatus based on the display of the at least one first display object.

2. The information processing apparatus according to claim 1, wherein the circuitry is further configured to:
control a display of a user interface (UI) object on the screen; and
control the display of the at least one first display object along a circumference of the UI object, wherein the at least one first display object corresponds to content associated with the first external apparatus.

3. The information processing apparatus according to claim 2, wherein the circuitry is further configured to:
receive the content from the first external apparatus; and
reproduce the received content based on a selection of the at least one first display object.

4. The information processing apparatus according to claim 2, wherein the content associated with the first external apparatus is at least one of image content, audio content, or video content.

5. The information processing apparatus according to claim 2, wherein the circuitry is further configured to scroll the at least one first display object along the circumference of the UI object.

6. The information processing apparatus according to claim 2, wherein a shape of the UI object is an oval shape.

7. The information processing apparatus according to claim 6, wherein the at least one first display object is on an oval track of the UI object.

8. The information processing apparatus according to claim 1, wherein the circuitry is further configured to control the display of the at least one first display object based on:

the relative position of the first external apparatus, and
a rotation angle of the first external apparatus with respect to the screen.

9. The information processing apparatus according to claim 1, wherein the circuitry is further configured to control a display of an application window, associated with the information processing apparatus, along with the at least one first display object.

10. The information processing apparatus according to claim 1, wherein the circuitry is further configured to:
control a display of a second display object that corresponds to content associated with the information processing apparatus; and
control data exchange between the information processing apparatus and the first external apparatus based on the display of the at least one first display object and the display of the second display object.

11. The information processing apparatus according to claim 1, wherein the circuitry is further configured to control the display of the at least one first display object based on a first past relative position of the first external apparatus with respect to the screen.

12. The information processing apparatus according to claim 11, wherein
the circuitry is further configured to control a display of a second display object based on a second past relative position of the first external apparatus with respect to the screen, and
the second past relative position is different from the first past relative position.

13. The information processing apparatus according to claim 12, wherein
the first external apparatus transmits content to the information processing apparatus,
the content corresponds to one of the second display object or the at least one first display object, and
the content is transmitted based on:
a user input, and
one of the first past relative position or the second past relative position.

14. The information processing apparatus according to claim 1, wherein the circuitry is further configured to:
control a display of a second display object on the screen based on a relative position of a second external apparatus with respect to the screen; and
control data coordination between the first external apparatus and the second external apparatus based on the display of the at least one first display object and the display of the second display object.

15. The information processing apparatus according to claim 1, wherein
the at least one first display object comprises a User Interface (UI) object, and
the circuitry is further configured to remotely operate the first external apparatus based on the UI object.

16. An information processing method, comprising:
in an information processing apparatus that includes a screen:
controlling a display of a specific pattern on the screen;
acquiring a relative position of a camera of an external apparatus with respect to the screen of the information processing apparatus, wherein
the camera of the external apparatus faces the screen,
the relative position of the camera of the external apparatus with respect to the screen is determined based on an image of the displayed specific pattern captured by the camera of the external apparatus, and
the relative position is a position of the camera of the external apparatus relative to the screen of the information processing apparatus;
controlling a display of a display object on the screen based on the relative position of the external apparatus with respect to the screen; and
controlling data coordination between the information processing apparatus and the external apparatus based on the display of the display object.

17. The information processing method according to claim 16, further comprising controlling the display of the display object based on:
the relative position, and
a rotation angle of the external apparatus with respect to the screen.

18. A non-transitory computer-readable medium having stored thereon computer-executable instructions that, when executed by a computer in an information processing apparatus, cause the computer to execute operations, the operations comprising:
controlling a display of a specific pattern on a screen of the information processing apparatus;
acquiring a relative position of a camera of an external apparatus with respect to the screen of the information processing apparatus, wherein
the camera of the external apparatus faces the screen,
the relative position of the camera of the external apparatus with respect to the screen is determined based on an image of the screen displayed specific pattern captured by the camera of the external apparatus, and
the relative position is a position of the camera of the external apparatus relative to the screen of the information processing apparatus;
controlling a display of a display object on the screen based on the relative position of the external apparatus with respect to the screen; and
controlling data coordination between the information processing apparatus and the external apparatus based on the display of the display object.

19. The information processing apparatus according to claim 1, wherein
the circuitry is further configured to control a display of a moving image pattern on the screen,
the display of the moving image pattern includes a display of a moving image on the screen, and
the relative position of the first external apparatus with respect to the screen is further determined based on an image of the displayed moving image pattern captured by the camera of the first external apparatus.

20. The information processing apparatus according to claim 1, wherein
the camera of the first external apparatus generates specific parameters based on the image of the displayed specific pattern, and
the relative position of the camera of the first external apparatus with respect to the screen is further determined based on the generated specific parameters.

21. The information processing apparatus according to claim 20, wherein
the specific parameters indicate a direction of change of values of image characteristics of the image of the displayed specific pattern.

* * * * *